United States Patent [19]

Austin et al.

[11] 4,003,032
[45] Jan. 11, 1977

[54] AUTOMATIC TERMINAL AND LINE SPEED DETECTOR

[75] Inventors: Michael M. Austin, Salt Lake City; William G. Barrett, Bountiful, both of Utah

[73] Assignee: Sperry Rand Corporation, New York, N.Y.

[22] Filed: June 9, 1975

[21] Appl. No.: 584,994

[52] U.S. Cl. .............................................. 340/172.5
[51] Int. Cl.² ........................ G06F 3/00; G06F 3/04
[58] Field of Search ................................. 340/172.5

[56] References Cited
UNITED STATES PATENTS

| | | | |
|---|---|---|---|
| 3,311,889 | 3/1967 | Birmingham | 340/172.5 |
| 3,560,937 | 2/1971 | Fischer | 340/172.5 |
| 3,618,037 | 11/1971 | Wollum | 340/172.5 |
| 3,699,525 | 10/1972 | Klavins | 340/172.5 |
| 3,771,135 | 11/1973 | Huettner | 340/172.5 |
| 3,828,325 | 8/1974 | Stafford | 340/172.5 |
| 3,909,791 | 9/1975 | Wouter van den Berg | 340/172.5 |

*Primary Examiner*—Gareth D. Shaw
*Assistant Examiner*—James D. Thomas
*Attorney, Agent, or Firm*—Kenneth T. Grace; Thomas J. Nikolai; Marshall M. Truex

[57] ABSTRACT

A system for and a method of automatically determining the terminal characteristics and line speed of an unknown asynchronous line terminal are disclosed. The automatic terminal and line speed detector (ATLSD) is a feature that is selectably addable to an existing communications multiplexer module (CMM) of an existing communications controller (CC). The CMM provides the means for selectively intercoupling one of a plurality of different line terminals (LT) at a plurality of remote sites to a central processor (CP) at a central site. The ATLSD includes an ATLSD Table in which are stored a plurality of multibit terminal identifier characters (TICs), each of which TICs defines the terminal identity, terminal characteristics and line speed of the LT that is identified thereby. When ATLSD is desired, a command from the CP places the ATLSD in the scan mode and loads a count transition number (CTN) and a character transition number (KTN) into associated registers of the CMM. The first character that is transmitted by the LT that is to be identified by the ATLSD is sampled by a transition detector for Mark to Space and Space to Mark transitions with a real-time sample counter initiated by the first Mark to Space transition caused by the initial Start ($S_T$) bit. As the sample count accrues, it is compared to the currently addressed one of the maximum sample counts that are associated with and are a part of each of the terminal identifier characters that are stored in successive address locations of the ATLSD Table. When the current sample count equals the currently compared to maximum sample count that is stored in and associated with the currently addressed terminal identifier character, the ATLSD Table location address is incremented to address the next subsequent terminal identifier character (the terminal identifier characters that define a set of line terminals are stored in the ATLSD Table in an ascending order of successively increasing maximum sample counts). Several sets of terminal identifier characters may be stored in the ATLSD Table. When the number of signal transitions that is detected by the transition detector equals the CTN, i.e., CTN = 0, the address incrementer is disabled and no further change in the ATLSD Table location address is made. However, the transition detector continues counting transitions until the character transition number (KTN), as determined by the last signal transition of the first character, is reached. When the KTN is reached, the ATLSD Table is referenced to read out a portion of the currently addressed terminal identifier character which portion is then transferred to the associated CMM registers from which the CMM conditions its associated logic to accommodate the terminal characteristics and line speed of the identified LT.

19 Claims, 37 Drawing Figures

TIC BYTE FORMAT
ATLSD TABLE

Fig. 7

BYTE 1: (LOADED LAST)

| | | ATLSD MODE | | ENABLE DATA INPUT | | | |
|---|---|---|---|---|---|---|---|
| X | X | 1 | 1 | 0 | 0 | 1 | 0 |
| 7 | 6 | 5 | 4 | 3 | 2 | 1 | 0 |

BYTE 2:

| CTN | | | 0 | KTN | | | |
|---|---|---|---|---|---|---|---|
| 7 | | 5 | 4 | 3 | | | 0 |

BYTE 3:

| 0 | 0 | 0 | STARTING ADDRESS LOCATION IN ATLSD TABLE | | | | |
|---|---|---|---|---|---|---|---|
| 7 | | 5 | 4 | | | | 0 |

BYTE 4:

| X | X | X | X | 0 | X | 0 | X |
|---|---|---|---|---|---|---|---|
| 7 | | | 4 | 3 | 2 | 1 | 0 |

ATLSD BYTE FORMATS FIRST CHARACTER MONITOR ONLY REGISTER FILE

BITS 3,1
0,0 ASYNC CLOCK

Fig. 19

WRITE 50 - LOAD ATLSD TABLE

DATA BUS FORMAT

| 15 | 14 13 12 11 | 10 9 8 | 7 6 5 4 3 2 1 0 |
|---|---|---|---|
| 1 | ADDRESS LOC TO BE LOADED | BYTE NO. (1 of 3) | TIC BYTE 1, 2, & 3 |

I/O CONTROL WORD

BITS 9,8
0,1 - TIC BYTE 1
1,0 - TIC BYTE 2
1,1 - TIC BYTE 3

Fig. 20

BYTE 2:

| 0 | 0 | 1 | 0 | 1 | 0 | 0 | 0 |
|---|---|---|---|---|---|---|---|
| 7 | 6 | 5 | 4 | 3 | 2 | 1 | 0 |

STATUS BYTE FORMAT REGISTER FILE

BITS 6,5,3
0,0,1 LT TYPE IDENTIFIED
0,1,X SUCCESSFUL ATLSD OPERATION
1,X,X UNSUCCESSFUL ATLSD OPERATION

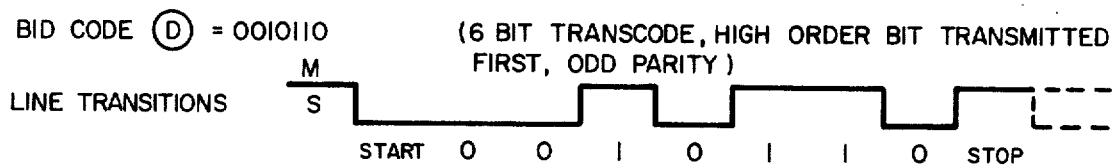
Fig. 9   IBM 2741   134.5 BAUD
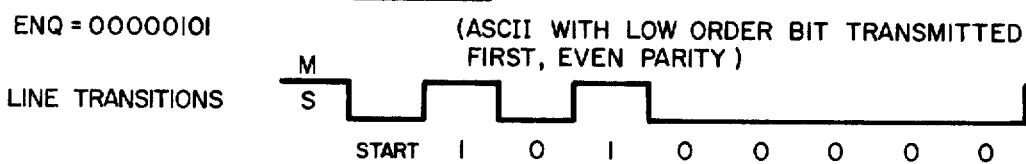
Fig. 10   DCT 500   150 BAUD
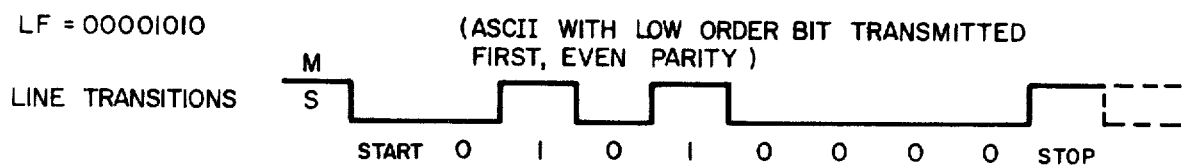
Fig. 11   TTY 37   150 BAUD
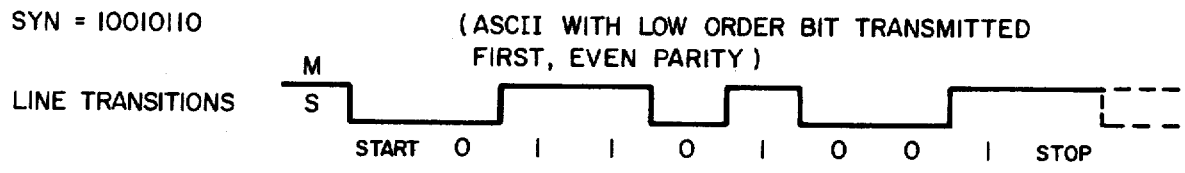
Fig. 12   DCT 500   110 BAUD
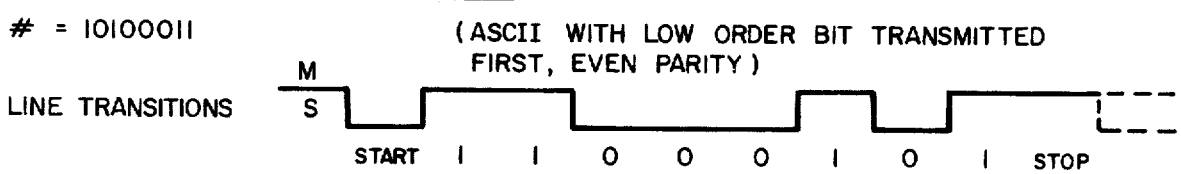
Fig. 13   TTY 33   110 BAUD
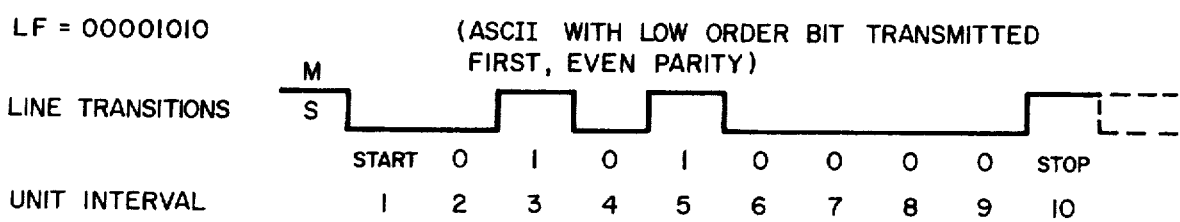
Fig. 14   DCT 500   300 BAUD

AUTOMATIC TERMINAL AND LINE SPEED DETECTOR

REFERENCE TO RELATED PATENT APPLICATION

The ATLSD of the present invention is a feature that is selectably addable to an existing communications multiplexer module (CMM) that is more fully disclosed in the copending patent application of W. A. Law, et al, Ser. No. 567,261, filed Apr. 11, 1975.

BACKGROUND OF THE INVENTION

In the prior art it is known that real-time data processing systems may include a central processor at a central site that is selectably coupled to one of a plurality of line terminals at a plurality of remote sites. These remote line terminals utilize existing telephone line transmission systems to be coupled to the central processor through a communications demultiplexer/multiplexer at the central site. Intercoupling of a particular remote line terminal to the central processor may be initiated by either the central processor or the particular line terminal. In either situation, the central processor must know the terminal characteristics and line speed of the transmitting/receiving line terminal so that the central processor may condition its internal logic circuitry to receive/transmit the digital data in the terminal characteristics and at the line speed that is utilized by the particular line terminal.

In some systems, line speed is known and only the terminal characteristics are to be determined. Such systems may include a hardware system called an answerback circuit for transmitting to the central processor the necessary information that identifies and defines the terminal characteristics — see U.S. Pat. No. 3,697,961. In those systems in which neither terminal characteristics nor line speed are known, software subroutines or algorithms may be utilized by the central processor to determine unknown terminal characteristics and line speed, — see the publication "Identifying Terminals in Terminal-Oriented Systems," J. F. Ossanna, IEEE Transactions on Communications, Volume COM 20, No. 3, June, 1972, pp. 565–568. However, software algorithms, when utilized to identify both terminal characteristics and line speeds of a plurality of unknown and remote line terminals of greatly differing terminal characteristics and line speeds, may occupy a significant and disproportionate amount of the central processor's data processing time. Thus, there is a need for a hardware system for automatically determining both the terminal characteristics and the line speed of each of a plurality of remote and unknown line terminals of greatly differing terminal characteristics and line speeds.

SUMMARY OF THE INVENTION

In the present invention, both the terminal characteristics and the line speed of any one of a plurality of remote and unknown line terminals (LT) are automatically determined by a hardware system that utilizes the latest small scale integrated (SSI) and medium scale integrated (MSI) semiconductor circuitry that operates at the fastest of central processor (CP) speeds. The automatic terminal and line speed detector (ATLSD) of the present invention is incorporated within two back-panel plug-in printed circuit boards that are selectably connected into the communications multiplexer module (CMM) of the existing communications controller (CC) that selectably couples the CP to any one of a plurality of remote and unknown LTs. The ATLSD includes an MSI RAM look-up ATLSD Table in which are priorly stored a plurality of terminal identifier characters (TICs) that define the terminal characteristics and line speeds of all of the LTs that may be coupled into the system. Each TIC consists of three bytes: byte 1, which includes a maximum sample count; and bytes 2 and 3 which include the terminal characteristics and line speed of the LT that is associated with and identified by the specified maximum sample count of byte 1.

When ATLSD is desired, a command from the CP places the ATLSD in the scan mode and loads a count transition number (CTN), a character transition number (KTN) and the initial address location in the ATLSD Table into associated port characteristic registers of the CMM. The first character that is transmitted by the LT, which is to be identified by the ATLSD, is sampled by a transition detector for Mark to Space and Space to Mark transitions with a sample counter enabled by the first Mark to Space transition that is caused by the initial Start ($S_T$) bit. As the sample count accrues, it is compared to the maximum sample count held in byte 1 of the TIC that is stored in the initially addressed location in the ATLSD Table. When the current sample count equals the maximum sample count that is stored in TIC byte 1 and that is associated with the initial, or current, TIC, the ATLSD Table location address is incremented to address the next subsequent ATLSD Table location address. (The TICs that define a set of line terminals are stored in the ATLSD Table in an ascending order of successively increasing maximum sample counts.) Several sets of TICs may be stored in the ATLSD Table. When the number of signal transitions that is detected by the transition detector equals the CTN, i.e., CTN = 0, the address incrementer is disabled and no further change in the ATLSD Table location address is made. However, the transition detector continues counting transitions until the character transition number (KTN), as determined by the last signal transition of the first character, is reached. When the KTN is reached, the ATLSD Table is referenced reading out the portion of the currently addressed TIC which TIC is associated with the maximum sample count at which the CTN = 0 determination occurred. At this time, of the currently addressed TIC, only bytes 2 and 3 are transferred from the ATLSD Table into associated CMM port characteristic registers. Also at this time and prior to receipt of the Start bit of the next or second character that is to be received from the LT that has been identified, existing logic within the CMM is conditioned to accommodate the second and subsequent characters that are to be transmitted by the remote LT and that are to be received by the CP. This conditioning of the CMM logic includes synchronization of the CMM signal clocking frequency and the decoding of the transmitting LT signal for error coding and protocol.

BRIEF DESCRIPTION OF THE DRAWINGS

FIG. 7 is an illustration of the ATLSD byte formats used in the ATLSD of the present invention.

FIGS. 9–14 14 are illustrations of exemplary Start Character waveforms for the noted Line Terminal types and line speeds.

FIG. 19 is an illustration of an exemplary Write 50 I/O Control Word format for the loading of the TICs into the ATLSD Table.

FIG. 20 is an illustration of an exemplary Status byte 2 format used by the ATLSD of the present invention.

TABLE OF CONTENTS

Description of the Remote Processing System Col. 4
Description of the Preferred Embodiment Col. 7
  Theory of Operation Col. 7
  Construction of the ATLSD Table Col. 8
  Design of ATLSD Table Col. 11
    Terminal Characteristics Col. 12
    Determination of CTN, KTN and Maximum Sample Count Col. 13
    Discussion of ATLSD System and Method of Operation Col. 15
    Discussion of Functional Block Diagram Col. 16
    Discussion of Detail Logic Diagrams Col. 20

DESCRIPTION OF THE REMOTE PROCESSING SYSTEM

Figure 1:
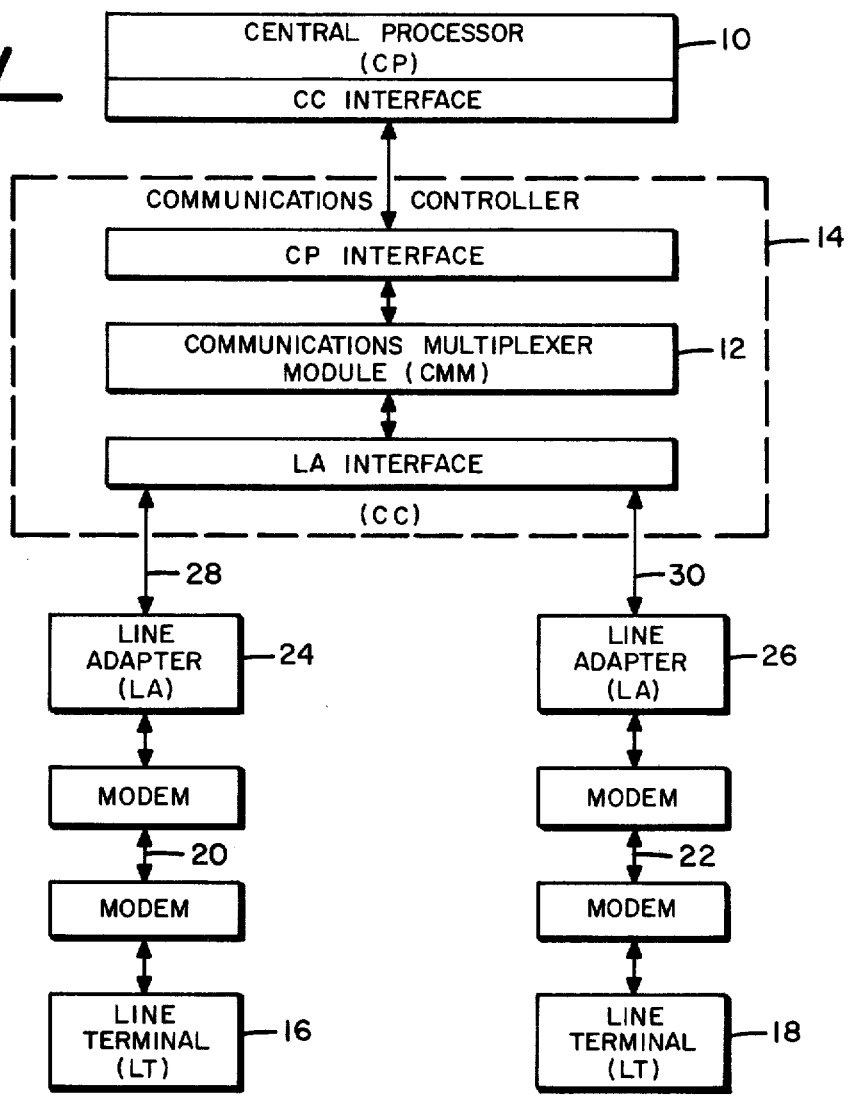
FIG. 1 is a block diagram of an existing real-time data processing system in which the present invention is incorporated.

With particular reference to FIG. 1 there is presented a block diagram of the real-time digital data processing system into which the present invention is incorporated. In this data processing system, central processor (CP) 10 utilizes communication multiplexer module (CMM) 12, which is a part of a communications controller (CC) 14, to communicate with a selectable one of a plurality, e.g., 128, of line terminals (LT) 16, 18 using existing telephone transmission line systems 20, 22. The automatic terminal and line speed detector (ATLSD) of the present inventon is comprised of two printed circuit boards that are selectably, back-panel plug-in connected to CMM 12. The ATLSD of CMM 12 is utilized by CP 10 to automatically detect the data rate and terminal type of an unknown transmitting line terminal (LT) 16, 18. As CMM 12 scans the input/output (I/O) communication lines 28, 30, which communication lines 28, 30 couple CMM 12 to the associated line adapters (LA) 24, 26, the ATLSD upon the detection of the input data first character as it is received bit-serially over the associated communication lines 28, 30, operates upon the first character to detect both the terminal characteristics and line speed of the transmitting LT. These determined terminal characteristics and line speed are then utilized by CMM 12 to condition its associated logic to receive, at the determined line speed, the second and subsequent characters as they are transmitted by the transmitting LT. These terminal characteristics include an identification field plus the particular code, code length and error detecting technique that are utilized by the transmitting LT.

Figure 2:
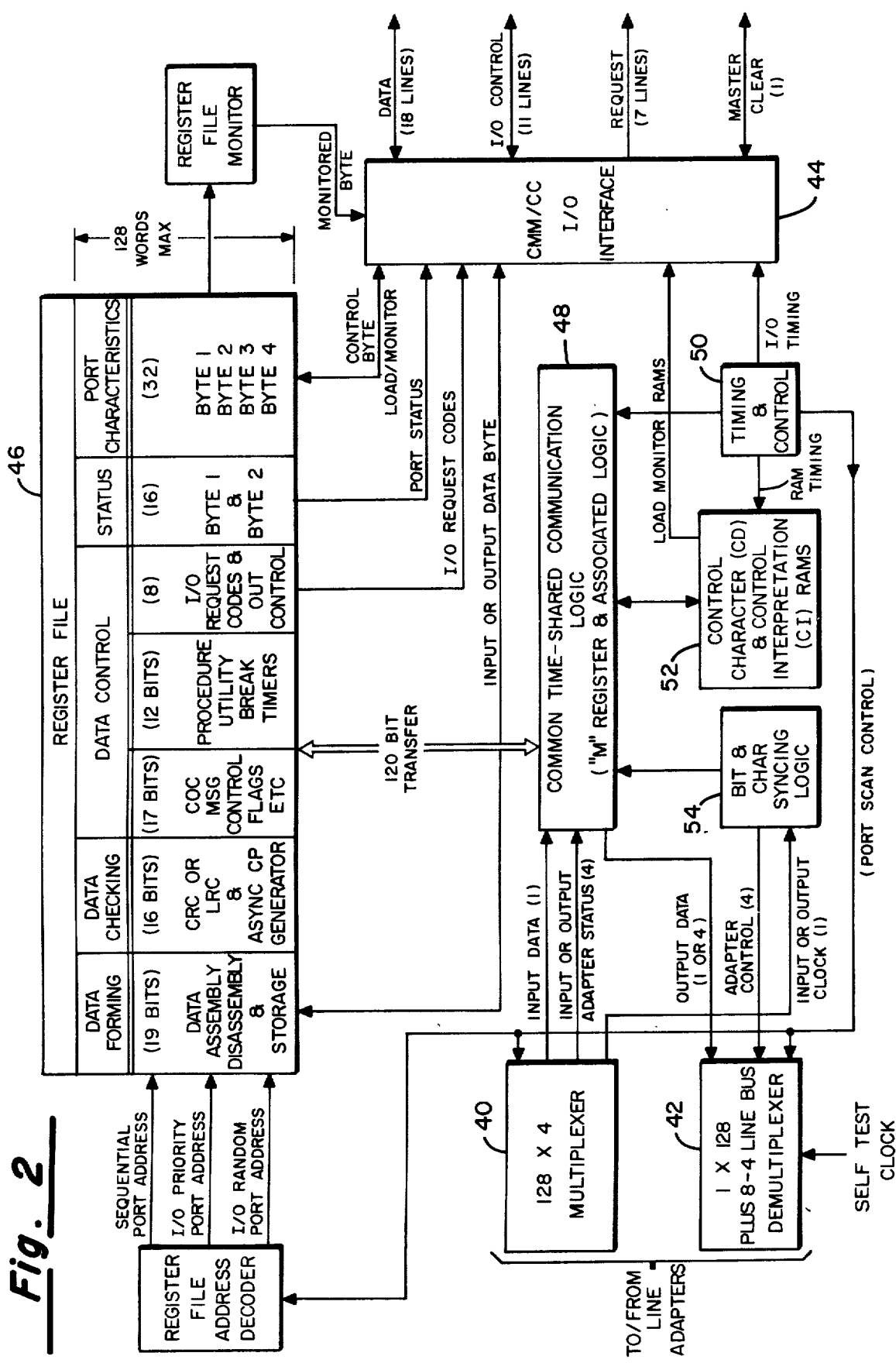
FIG. 2 is a block diagram of the CMM of FIG. 1.

With particular reference to FIG. 2 there is presented a functional block diagram of an existing CMM 12 into which the ATLSD of the present invention is selectably incorporated as an added feature thereof. CMM 12 is more fully disclosed in the copending patent application of W. A. Law, et al, filed Apr. 11, 1975, having Ser. No. 567,261, which patent application is incorporated herein by reference. CMM 12, as illustrated in FIG. 2, may be subdivided into the following four basic functional areas: input multiplexer (MUX) 40; output demultiplexer (DEMUX) 42; CMM/CC I/O interface 44 and the internal logic including register file 46 and the common time-shared communication logic 48 including the M register and associated logic. These basic funtions are controlled in their proper sequence by signals generated by timing and control 50, control character (CD) and control interpretation (CI) RAMS 52 and bit and character synchronizing logic 54.

The input multiplexer 40 is scanned by one of three rates depending upon the port assignment, e.g., CMM 12 accommodates a maximum of 128 ports or input-/output communication lines 28, 30. In conjunction with the register file 46, input multiplexer 40 performs a serial-to-parallel conversion (assembly) of serial input data received on each input communication line 28, 30. Scanning rates are adequate to service the first 16 ports with data rates up to 56K baud, the next 48 ports with data rates up to 10.8K baud and the final 64 ports with data rates up to 3.2K baud. The output demultiplexer 42 is similar to the input multiplexer 40 in its operation, and in conjunction with register file 46 performs a parallel-to-serial conversion (disassembly) of parallel output data received from CP 10. Register file 46, in combination with the communication logic 48, controls the overall function of CMM 12 including: serial-to-parallel conversion in conjunction with input multiplexer 40, parallel-to-serial conversion in conjunction with output demultiplexer 42; character storage to await input/output to CP 10; bit synchronization of synchronous lines; character framing and synchronization of synchronous lines; generates line-oriented status; controls various communication lines operations and procedures including suppress, monitor, duplicate, start-stop longitudinal redundancy check (LRC) cyclic redundancy check (CRC) accumulation, Start of Messge (SOM), End of Message (EOM), etc.; identifies communication line characteristics such as character length, line speed, code type, protocol, etc.

I/O interface 44 functions to perform the means whereby CMM 12 communicates with CP 10 and includes the capability of monitoring any port within register file 46 on a low priority basis while transferring data bytes and status bytes on a priority basis with the lower numbered port having the highest priority.

Timing of the operation of CMM 12 includes major cycles and minor cycles. A major cycle is one complete scan of the 128 input/output communication lines while a minor cycle occurs during the period of time that CMM 12 is coupled to a given one of the 128 communication lines. A minor cycle consists of the transfer from register file 46 of a partially assembled/-disassembled character by one bit (if required) by inputing one bit when multiplexing or outputing one bit when demultiplexing, then transferring the modified character back into register file 46. When a character assembly is complete by detecting an End of Character (EOC) the character is transferred from the assembly/-disassembly area to the character storage area of register file 46 to await transfer to CP 10. This vacates the character assembly area and readies it for the assembly of a new character. A service request is made to the priority logic and when I/O interface 44 is available, the highest priority port will be the next one serviced. When a character disassembly is complete, a new character is transferred from the character storage area of register file 46 to the assembly/disassembly area and a new character is requested from CP 10 and is then serviced based upon its priority. CMM 12 is designed to generate status words which are transferred to CP 10 upon detection of parity errors, overrun conditions, etc.

At any given minor cycle time a selected line adapter (LA) 24, 26 is processed by reading out of an associated one of 128 word registers of register file 46 a 120-bit word which contains all the characteristics and up-to-date information concerning the associated one of the 128 communication lines 28, 30. This "big word," which is placed in the timeshared communication logic 48, sets up CMM 12 logic to handle the characteristics of the particular line terminal (LT) 16, 18 it is presently processing, e.g., asynchronous, input, 2400 baud, 7 bits/character with odd parity, etc. During this time-slice of the minor cycle, if any new information has occurred in the communication line such as status or a new bit of data, it will be processed and the new result placed back into register file 46. If the new bit of data information from input multiplexer 40 resulted in the completion of a character, this character is compared with Look-Up RAMs included within communication logic 48 and control character (CD) and control interpretation (CI) RAMs 52 to first determine what it is and how to process this particular character. After a character is formed it is transferred from register file 46 to the I/O interface 44 under a priority scheme independent of the time-shared logic of communication logic 48.

FIG. 2 illustrates that the basic organization of the 120-bit register file 46 is comprised of five basic areas:
data forming (19 bits)
data checking (16 bits)
data control (37 bits)
status (16 bits)
port characteristics (32 bits).

The data forming register area is broken down into assembly/disassembly (11 bits) and storage (8 bits) areas. The data checking register area group is divided into CRC or LRC areas while the data control register area contains control flags, various timers, etc., to do specific tasks such as to determine when a character is formed, check when a communication line has gotten into synchronization, time various functions and to determine when to insert various characters such as synchronization (SYN) and idle (DLE), etc. The status register area consists of two status bytes and stores up various status conditions from LA 24, 26 or various error conditions resulting from parity errors, data overruns, etc. The port characteristic register area consists of four control bytes of line characteristics which define the LT 16, 18 type such as synchronous, input, 7-bit character with odd parity, CRC, etc. These four control bytes also determine various other characteristics, i.e., generate a specific preamble, select a specific character code type, specify which programmed line procedure to use, etc. FIG. 2 also illustrates that I/O interface 44 consists of 37 lines having the specific functions as noted thereon.

Figure 3:
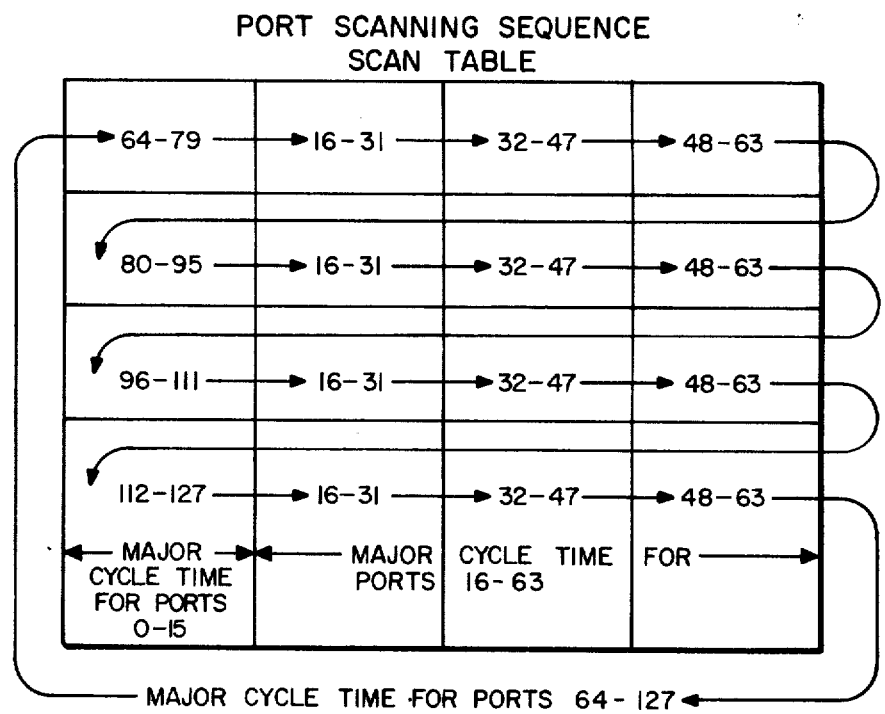
FIG. 3 is a diagram of the scan table that defines the order in which the communication lines of FIG. 1 are scanned for signal demultiplexing.
Figure 4:
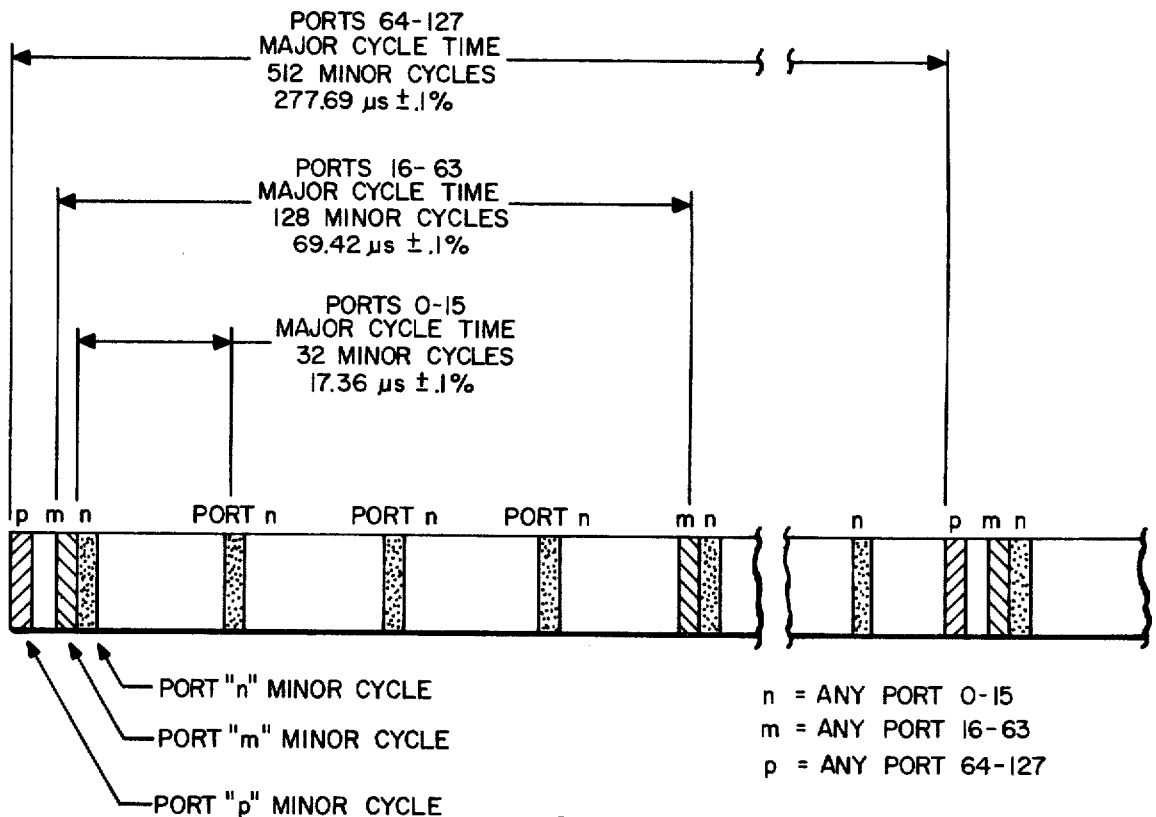
FIG. 4 is a timing diagram of the major scan cycle used in the system of FIG. 1.

With particular reference to FIG. 3 there is presented a schematic illustration of the manner in which CMM 12 scans the 128 ports 0–127 over the major timing diagram of FIG. 4. CMM 12 utilizes three different scan rates which are fixed regardless of the configuration of the ports. The basic oscillator is a crystal controlled oscillator chip which generates a 14.75± 0.01% megahertz (MHz) symmetrical squarewave. This is counted down by eight to give one minor cycle time of 542 nanoseconds (ns)± 0.1%. See FIG. 5. The minor cycle time is divided into 16 unit intervals, i.e., one timing pulse (TP), of approximately 33.9 ns ± 1%. A minor cycle is the time spent on any given port, i.e., one of the 128 communication lines 28, 30, and a major cycle is the time to return again to that same given port. There are three major cycle times (32 minor cycles, 128 minor cycles and 512 minor cycles). Ports 0–15 (17.36 microseconds ($\mu$s)) are scanned four times faster than ports 16–63 (69.4 $\mu$s) which in turn are scanned four times faster than ports 64–127 (277.7 $\mu$s). The ratio of scanning is therefore 1:4:16. It is to be noted that ports 0–15 are interlaced with each scan group. One pass through the scan table will sample ports 0–15 16 times, ports 16–63 four times and ports 64–127 one time each. The theoretical absolute maximum scan rates that each port group can handle are 57.6K baud for ports 0–15, 11.5K baud for ports 16–63, and 3.601K baud for ports 64–127. Assuming a transmitting LT 16 baud rate of 1200 baud on port 0, each bit that is transmitted by LT 16 would occupy approximately 0.83 millisecond (ms) duration. With port 0 being serviced or scanned on a major cycle of once every 17.36$\mu$s, each input data bit would be scanned approximately 48 times.

Figure 5:
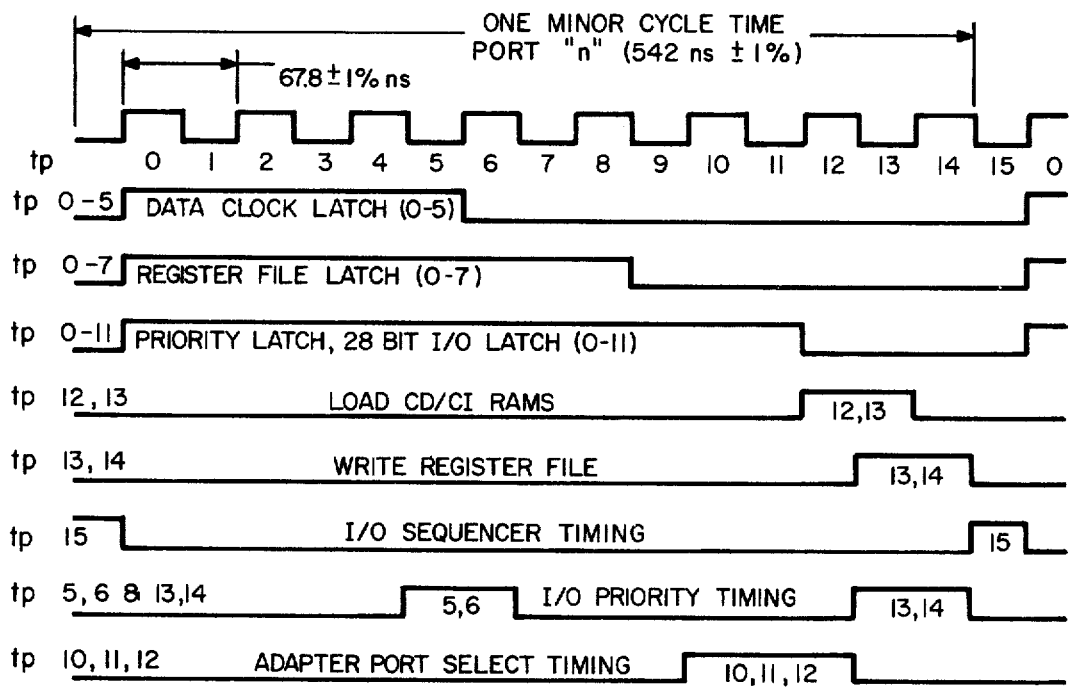
FIG. 5 is a timing diagram of the minor scan cycle used in the system of FIG. 1.

With reference to FIG. 5 there is illustrated the minor cycling timing diagram of CMM 12. One minor cycle, the amount of time spent on a given port in order to process it, is generated accurately by the count-down of a precise crystal controlled oscillator (14.75 MHz). The normal minor cycle (542.0 ns) is generated by a reflected gray code counter and consists of timing pulses 0 through 15. Timing pulses TP 0–5, TP 0–7, and TP 0–11 are used to load the holding registers of the various RAMs located in CMM 12, while TP 12, 13, 14 are used to write into the various RAMs in CMM 12. The scan operation is advanced at the beginning of each TP 15 to switch to the next selected port. All CMM 12 minor cycles are 542.0 ns ± 1% long with the following two exceptions: an extended cycle and a compensated cycle. The extended cycle occurs at an EOC time and is stretched out 50% (from 542 to 813 ns). The purpose of this 271 ns ± 1% extension is to allow for additional propagation time that is required when two additional RAM accesses are made to the control character (CD) and control interpretation (CI) RAMs at an EOC time. In order to compensate for this added 271.0 ns time, the next minor cycle that occurs when a port is turned off is reduced by 271 ns ± 1%. A 4-stage up-down counter is used to count the number of extended minor cycle times and is incremented each extended time. This counter is decremented each time a compensating cycle is generated.

DESCRIPTION OF THE PREFERRED EMBODIMENT

Theory of Operation

As stated hereinabove the ATLSD of the present invention is incorporated within two back-panel plug-in printed circuit boards that are selectably connected into the existing CMM 12 of a CC 14 that selectably couples a CP 10 to any one of 128 LTs 16, 18— see FIG. 1. The ATLSD monitors the predetermined first character that is received from a transmitting LT and automatically sets the communication system parameters to comply with the terminal characteristics and line speed of the transmitting LT. This initial first character may be the first character of a message, SOH or STX or may be a specific character that is generated from a keyoard or otherwise at the transmitting remote site.

To implement the detection method of the ATLSD of the present invention, the systems programmer must priorly know the terminal characteristics and line speed of all, e.g., 4, of the, i.e., the set of the, LTs that may be coupled to each separate one of all, e.g., 128, of the ports or I/O communication lines 28, 30 that are a part of the real-time data processing system in which remote data processing is to be accommodated and upon which the ATLSD operation is to be performed. From this knowledge, the systems programmer then, for each different set of LTs that may be associated with a port, establishes a group of multibit first characters in which all first characters in the group have an identical number of signal transitions (from Mark to Space or from Space to Mark), i.e., have identical character transition numbers (KTN), e.g., 5, from the initial Start ($S_T$) bit transition through to the last signal transition of the first character. Further, all first characters in the group have an identical intermediate number of signal transitions, i.e., a count transition number (CTN), e.g., 3, between the initial Start bit transition, e.g., 0, and the last signal transition, e.g., 5, i.e., 0 <CTN <KTN. The same CTN and KTN will be used by the ATLSD for any given set of TICs while several sets of TICs with different or the same CTN and KTN may be accommodated within the ATLSD Table. Further, the first characters of each group are chosen such that each CTN that is associated with a given set of TICs has a different real-time sample count which real-time sample count is initiated by the initial Start bit transition and is used by the ATLSD to identify the transmitting LT. The variables of each LT that may be used to construct this group of first characters include 1. The line speed or transmission (baud) rate of the LT.
2. The choice of first character that is available from the LT.

These variables are a function of the type of LT that is to be identified and are utilized in the generation of the detection-counter tables and then the terminal identifier character (TICs) that are stored in the ATLSD Table.

As each first character is received by the ATLSD, the initial Start bit transition initiates an 8-bit sample counter which is driven by an 1800 Hz clocking signal. The 8-bit sample counter increments at approximately 0.5 millisecond (ms) intervals and counts the number of real-time sample counts to and through the CTN and if before reaching the KTN the sample counter reaches its maximum count of all 1's, it generates an all 1's detect signal that, in turn, generates an Unsuccessful ATLSD operation signal. To ensure reliable operation, i.e., accurate determination of the number of the real-time sample counts required to reach the CTN, some gross start-stop distortion e.g., 45%, (including telegraph distortion) is calculated and included in the detection-counter table. This distortion establishes the minimum and maximum ranges of the unit intervals or time durations of each baud for each unit interval for the particular baud rate. These detection-counter Tables A-K for the respective baud rates 75 baud through 1800 baud are then used to establish the maximum sample counts that are associated with the terminal characteristics and line speed and which are used to construct the terminal identification characters (TICs) that are to be stored in the ATLSD Table.

Construction of the ATLSD Table

Figure 6:
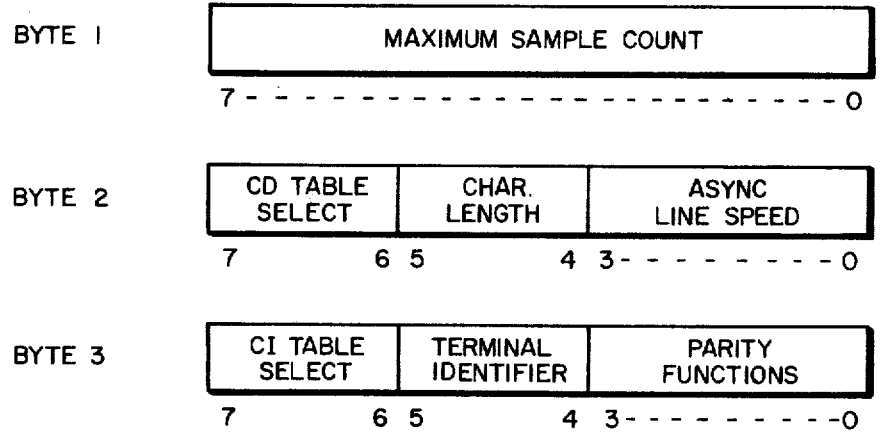
FIG. 6 is an illustration of the TIC byte formats used in the ATLSD of the present invention.

At system initialization time, a CP 10 must have loaded the terminal identification characters (TIC$_s$) into the ATLSD Table. In the preferred and illustrated embodiment of the present invention the ATLSD Table is comprises of 16 24-bit words, each of the 16 24bit words or TICs being comprised of three TIC bytes, 1, 2, 3, each of which TIC bytes is comprises of 8 bits 7-0. TIC bytes 1, 2 and 3, which are stored in the ATLSD Table, are as illustrated in FIG. 6. TIC byte 1 contains a binary word that represents the maximum sample count of the range for a particular first character that is received from an LT, the terminal characteristics and line speed of which are to be determined. The minimum maximum sample count of the range is indicated by the content of TIC byte 1 of the next adjacent lower-ordered TIC byte 1

TABLE A

| DETECTION-COUNTER TABLES 75 Baud 45% Distortion | | | |
|---|---|---|---|
| Unit Intervals | Count | Min. | Max. |
| 1 | 26.65 | 14.67 | 38.67 |
| 2 | 53.33 | 41.33 | 65.33 |

TABLE A -continued

DETECTION-COUNTER TABLES
75 Baud
45% Distortion

| Unit Intervals | Count | Min. | Max. |
|---|---|---|---|
| 3 | 79.99 | 68.00 | 92.00 |
| 4 | 106.66 | 94.67 | 118.67 |
| 5 | 133.30 | 121.33 | 145.33 |
| 6 | 159.96 | 148.00 | 172.00 |
| 7 | 186.62 | 174.67 | 198.67 |
| 8 | 213.28 | 201.33 | 225.33 |
| 9 | 239.94 | 228.00 | 252.00 |

TABLE B

100 Baud
45% Distortion

| Unit Intervals | Count | Min. | Max. |
|---|---|---|---|
| 1 | 20 | 11 | 29 |
| 2 | 40 | 31 | 49 |
| 3 | 60 | 51 | 69 |
| 4 | 80 | 71 | 89 |
| 5 | 100 | 91 | 109 |
| 6 | 120 | 111 | 129 |
| 7 | 140 | 131 | 149 |
| 8 | 160 | 151 | 169 |
| 9 | 180 | 171 | 189 |

TABLE C

110 Baud
45% Distortion

| Unit Intervals | Count | Min. | Max. |
|---|---|---|---|
| 1 | 18.18 | 10.00 | 26.36 |
| 2 | 36.36 | 28.18 | 44.55 |
| 3 | 54.54 | 46.36 | 62.73 |
| 4 | 72.72 | 64.55 | 80.91 |
| 5 | 90.90 | 82.73 | 99.09 |
| 6 | 109.80 | 100.91 | 117.27 |
| 7 | 127.26 | 119.09 | 135.45 |
| 8 | 145.44 | 137.27 | 153.64 |
| 9 | 163.62 | 155.46 | 171.82 |

TABLE D

134.5 Baud
45% Distortion

| Unit Intervals | Count | Min. | Max. |
|---|---|---|---|
| 1 | 14.86 | 8.18 | 21.56 |
| 2 | 29.74 | 23.05 | 36.43 |
| 3 | 44.61 | 37.92 | 51.30 |
| 4 | 59.48 | 52.79 | 66.17 |
| 5 | 74.35 | 67.66 | 81.04 |
| 6 | 89.22 | 82.53 | 95.91 |
| 7 | 104.09 | 97.40 | 110.78 |
| 8 | 118.96 | 112.27 | 125.65 |
| 9 | 133.83 | 127.14 | 140.52 |

TABLE E

150 Baud
45% Distortion

| Unit Intervals | Count | Min. | Max. |
|---|---|---|---|
| 1 | 13.33 | 7.33 | 19.33 |
| 2 | 26.66 | 20.67 | 32.67 |
| 3 | 39.99 | 34.00 | 46.00 |
| 4 | 53.33 | 47.33 | 59.33 |
| 5 | 66.66 | 60.67 | 72.67 |
| 6 | 79.99 | 74.00 | 86.00 |
| 7 | 93.99 | 87.33 | 99.33 |
| 8 | 106.66 | 100.67 | 112.67 |
| 9 | 119.99 | 114.00 | 126.00 |

TABLE F

200 Baud
45% Distortion

| Unit Intervals | Count | Min. | Max. |
|---|---|---|---|
| 1 | 10.00 | 5.50 | 14.50 |
| 2 | 20.00 | 15.50 | 24.50 |
| 3 | 30.00 | 25.50 | 34.50 |
| 4 | 40.00 | 35.50 | 44.50 |
| 5 | 50.00 | 45.50 | 54.50 |
| 6 | 60.00 | 55.50 | 64.50 |
| 7 | 70.00 | 65.50 | 74.50 |
| 8 | 80.00 | 75.50 | 84.50 |
| 9 | 90.00 | 85.50 | 94.50 |

TABLE G

300 Baud
45% Distortion

| Unit Intervals | Count | Min. | Max. |
|---|---|---|---|
| 1 | 6.67 | 3.67 | 9.67 |
| 2 | 13.33 | 10.33 | 16.33 |
| 3 | 20.00 | 17.00 | 23.00 |
| 4 | 26.67 | 23.67 | 29.67 |
| 5 | 33.33 | 30.33 | 36.33 |
| 6 | 40.00 | 37.00 | 43.00 |
| 7 | 46.67 | 43.67 | 49.67 |
| 8 | 53.33 | 50.33 | 56.33 |
| 9 | 60.00 | 57.00 | 63.00 |

TABLE H

600 Baud
45% Distortion

| Unit Intervals | Count | Min. | Max. |
|---|---|---|---|
| 1 | 3.33 | 1.83 | 4.83 |
| 2 | 6.67 | 5.17 | 8.17 |
| 3 | 10.00 | 8.50 | 11.50 |
| 4 | 13.33 | 11.83 | 14.83 |
| 5 | 16.67 | 15.17 | 18.17 |
| 6 | 20.00 | 18.50 | 21.50 |
| 7 | 23.33 | 21.83 | 24.83 |
| 8 | 26.67 | 25.17 | 28.17 |
| 9 | 30.00 | 28.50 | 31.50 |

TABLE I

1050 Baud
45% Distortion

| Unit Intervals | Count | Min. | Max. |
|---|---|---|---|
| 1 | 1.90 | 1.00 | 2.76 |
| 2 | 3.80 | 2.95 | 4.66 |
| 3 | 5.70 | 4.86 | 6.57 |
| 4 | 7.60 | 6.76 | 8.48 |
| 5 | 9.50 | 8.66 | 10.38 |
| 6 | 11.40 | 10.57 | 12.29 |
| 7 | 13.30 | 12.48 | 14.19 |
| 8 | 15.20 | 14.38 | 16.10 |
| 9 | 17.10 | 16.29 | 18.00 |

TABLE J

| 1200 Baud | | | |
|---|---|---|---|
| | | | 45% Distortion |
| Unit Intervals | Count | Min. | Max. |
| 1 | 1.67 | 0.92 | 2.42 |
| 2 | 3.33 | 2.58 | 4.08 |
| 3 | 4.99 | 4.25 | 5.75 |
| 4 | 6.66 | 5.92 | 7.42 |
| 5 | 8.33 | 7.58 | 9.08 |
| 6 | 9.99 | 9.25 | 10.75 |
| 7 | 11.66 | 10.92 | 12.42 |
| 8 | 13.33 | 12.58 | 14.08 |
| 9 | 14.99 | 14.25 | 15.75 |

TABLE K

| 1800 Baud | | | |
|---|---|---|---|
| | | | 45% Distortion |
| Unit Intervals | Count | Min. | Max. |
| 1 | 1.111 | 0.611 | 1.611 |
| 2 | 2.220 | 1.722 | 2.722 |
| 3 | 3.330 | 2.833 | 3.833 |
| 4 | 4.440 | 3.944 | 4.944 |
| 5 | 5.550 | 5.055 | 6.055 |
| 6 | 6.660 | 6.166 | 7.166 |
| 7 | 7.770 | 7.277 | 8.277 |
| 8 | 8.880 | 8.388 | 9.388 |
| 9 | 9.990 | 9.500 | 10.500 | plus 1, while the minimum count of the first or initial TIC byte 1 in the ATLSD Table is always equal to 1. Additionally, the ranges for any two LTs that are listed next adjacent to each other must be consecutive integers and must not overlap. TIC bytes 2 and 3 are automatically transferred from the ATLSD Table to the positions in register file 46 that are reserved for port characteristics Control bytes 2 and 3.

Prior to activating an ATLSD operation, ATLSD byte formats 2, 3 and 4 of FIG. 7 must be preloaded, with ATLSD byte 1 last loaded, in the respective Control bytes 2, 3, 4, 1 positions of the port characteristic portion of register file 46. With respect to ATLSD byte 1, bits 5, 4 = 1, 1 specify the ATLSD Mode of operation while bits 3, 2, 1, 0 = 0, 0, 1, 0 are utilized to enable data input to the ATLSD.

With respect to ATLSD byte 2, bits 7-5 are utilized to specify the count transition number (CTN) or the intermediate number of signal transitions (1–7), including the initial Mark to Space transition of the Start bit, in the first character while bits 3–0 are utilized to specify the character transition number (KTN) or the total number of signal transitions (1–9), including the initial Mark to Space transition of the Start bit, in the first character.

With respect to ATLSD byte 3, bits 4-0 are utilized to specify the starting address in the ATLSD Table and would normally be all 0's except when there is more than one set of ATLSD terminal types specified in the ATLSD Table, while ATLSD byte 4 bits 3, 2, 1, 0 = 0, X, 0, X specify asynchronous clocking of the (CP) sample counter.

Design of ATLSD Table

Figure 8:
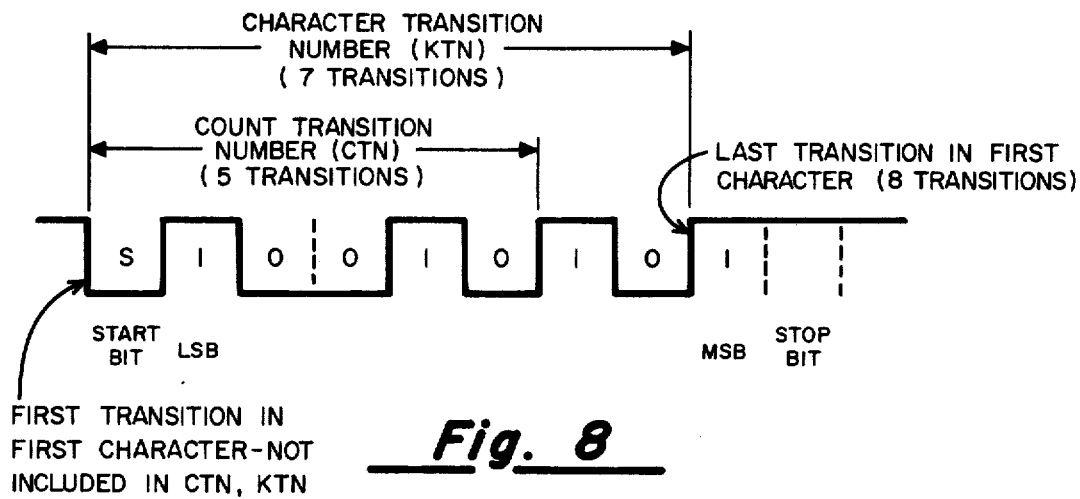
FIG. 8 is an illustration of an exemplary Start Character waveform and the pertinent term definitions as used in the ATLSD of the present invention.

With particular reference to FIG. 8 there is presented an illustrative example of the waveform of a first character having a count transition number (CTN) of 5 and a character transition number (KTN) of 7. When ATLSD is desired, a command from the central processor (CP) places the ATLSD in the scan mode and loads a count transition number (CTN) and a character transition number (KTN) of ATLSD byte 2 of FIG. 7 into the associated control byte 2 register of the register file 46 of the CMM. The first character that is transmitted by the LT that is to be identified by the ATLSD is sampled by a transition detector for Mark to Space and Space to Mark transitions with a sample counter initiated by the first Mark to Space transition that is caused by the initial Start bit. As the sample count accrues, it is compared to the maximum sample count held in TIC byte 1 of the initial terminal identifier character (TIC) that is stored in the ATLSD Table. When the current sample count equals the maximum sample count that is stored in TIC byte 1 and that is associated with the initial or current TIC, the ATLSD Table address location is incremented by 1 to address the next subsequent ATLSD Table address location and its associated TIC. When a match occurs, i.e., when the number of signal transitions detected by the transition detector equals the CTN, i.e., CTN = 0, the address incrementer is disabled and no further change in the ATLSD Table address location is made. However, the transition detector continues counting signal transitions until the character transition number (KTN), as determined by the last signal transition of the first character, is reached. When the KTN is reached, i.e., KTN = 0, the ATLSD Table is referenced, reading out the TIC bytes 1 and 2 that are associated with the maximum sample count of TIC byte 1 of the current ATLSD Table address location of the current sample count at which the match occurred.

To understand the basic philosophy of an ATLSD operation, certain rules for the generation of the ATLSD Table are to be understood:

1. More than one independent set of LT types may be stored in the ATLSD Table, e.g., Set 1 may consist of LTs types A, B, C, D while Set 2 may consist of LTs types E, F.
2. The same CTN, e.g., 3 for Set 1 and 2 for Set 2 and the same KTN, e.g., 5 for Set 1 and 3 for Set 2 must be shared by all the terminal identifier characters (TICs) of the set.
3. The TICs of each set must be stored in increasing ATLSD addressable locations according to their increasing maximum sample counts.
4. Entry into the ATLSD Table will be at the ATLSD addressable location in which is stored the TIC having the lowest maximum sample count of the set.
5. The distortion tolerances around the CTNs of the set do not overlap with the maximum sample count occurring between the tolerances.
6. The CTN must occur before the, e.g., 8-bit sample counter reaches the maximum sample count stored in the ATLSD Table of, e.g., 255.

Using these rules the design of a typical ATLSD Table will now be illustrated.

Assume that an ATLSD operation is to be performed on a combination of LT types including: Sperry Univac DCT 500, Teletype TTY 33, Teletype TTY 37, and IBM 2741.

Terminal Characteristics

DCT 500 — This LT's keyboard is capable of generating any of the 128 ASCII characters with the eighth bit odd or even parity. Transmission rate is switch selectable at 110, 150, or 300 baud.

TTY 33 — This LT's keyboard is capable of generating most ASCII characters (no lower case alphabet)

with eighth bit even parity. Transmission rate is 110 baud.

TTY 37 — This LT's keyboard is capable of generating all 128 ASCII characters with eighth bit even parity. Transmission rate is 150 baud.

IBM 2741 — This LT's keyboard is locked until the Bid key is activated. Activating the Bid key causes the keyboard to unlock and a Bid code is transmitted. The operator is then free to type a message. Transmission rate is 134.5 baud.

Determination of CTN, KTN and Maximum Sample Count

Because the IBM 2741 is the most restrictive LT on selection of the initial ATLSD sample character code, it is best to determine the ATLSD parameters for this LT first. The Bid code generated by the IBM 2741 is first analyzed and illustrated in FIG. 9. Using the illustrated Bid code there is provided a choice of detecting unit interval 4, 5, 6, 8 or 9; however, it is best to select a CTN that is in or near the center of the first character. Using this criterion, the third signal transition (5 unit intervals) is chosen for the CTN. This selection commits us to a $CTN = 3$ and a $KTN = 5$ for all first characters that are to be received from this set of terminals. Consulting the detection-counter Table D for a line speed of 134.5 baud, five unit intervals, a minimum sample count of 67.66 and a maximum sample count of 81.04 is determined.

Next, the DCT 500 and TTY 37, which transmit at 150 baud, are considered. For the DCT 500, the ENQ character is selected and is analyzed and illustrated in FIG. 10. Detection of the third signal transition, i.e., $CTN = 3$, requires that three unit intervals be measured. Consulting the detection-counter Table E for 150 baud, three unit intervals, a minimum sample count of 34.0 and a maximum sample count of 46.0 are determined. For the TTY 37, the Line Feed Character is selected and is analyzed and illustrated in FIG. 11. Detection of the third signal transition, i.e., $CTN = 3$, requires that four unit intervals be measured. Consulting the detection-counter Table E for 150 baud, four unit intervals, a minimum sample count of 47.33 and a maximum sample count of 59.33 are determined.

Next, the DCT 500 and TTY 33, which transmit at 110 baud are considered. For the DCT 500, the SYN character is selected and is analyzed and illustrated in FIG. 12. Detection of the third signal transition, i.e., $CTN = 3$, requires that five unit intervals be measured. Consulting the detection-counter Table C for 110 baud, five unit intervals a minimum sample count of 82.73 and a maximum sample count of 99.09 are determined. For the TTY 33, the number character is selected and is analyzed and illustrated in FIG. 13. Detection of the third signal transition, i.e., $CTN = 3$, requires that seven unit intervals be measured. Consulting the detection-counter Table C for 110 baud, seven unit intervals, a minimum sample count of 100.91 and a maximum sample count of 117.27 are determined.

Next, the DCT 500, which transmits at 300 baud is considered. For the DCT 500, the Line Speed (LS) character is selected and is analyzed and illustrated in FIG. 14. Detection of the third signal transition, i.e., $CTN = 3$, requires that four unit intervals be measured. Consulting the detection-counter Table G for 300 baud, four unit intervals, a minimum sample count of 23.67 and a maximum sample count of 29.67 are determined.

The maximum sample count that is to have the format of TIC byte 1, FIG. 6, that is to be stored in the ATLSD Table for each of the above noted LTs can now be determined from the above process and is presented in tabular form in Table L with the LTs arranged in an ascending order of maximum sample counts and stored in an ascending order of word addressable locations 0–5 of ATLSD Table.

Figure 15:
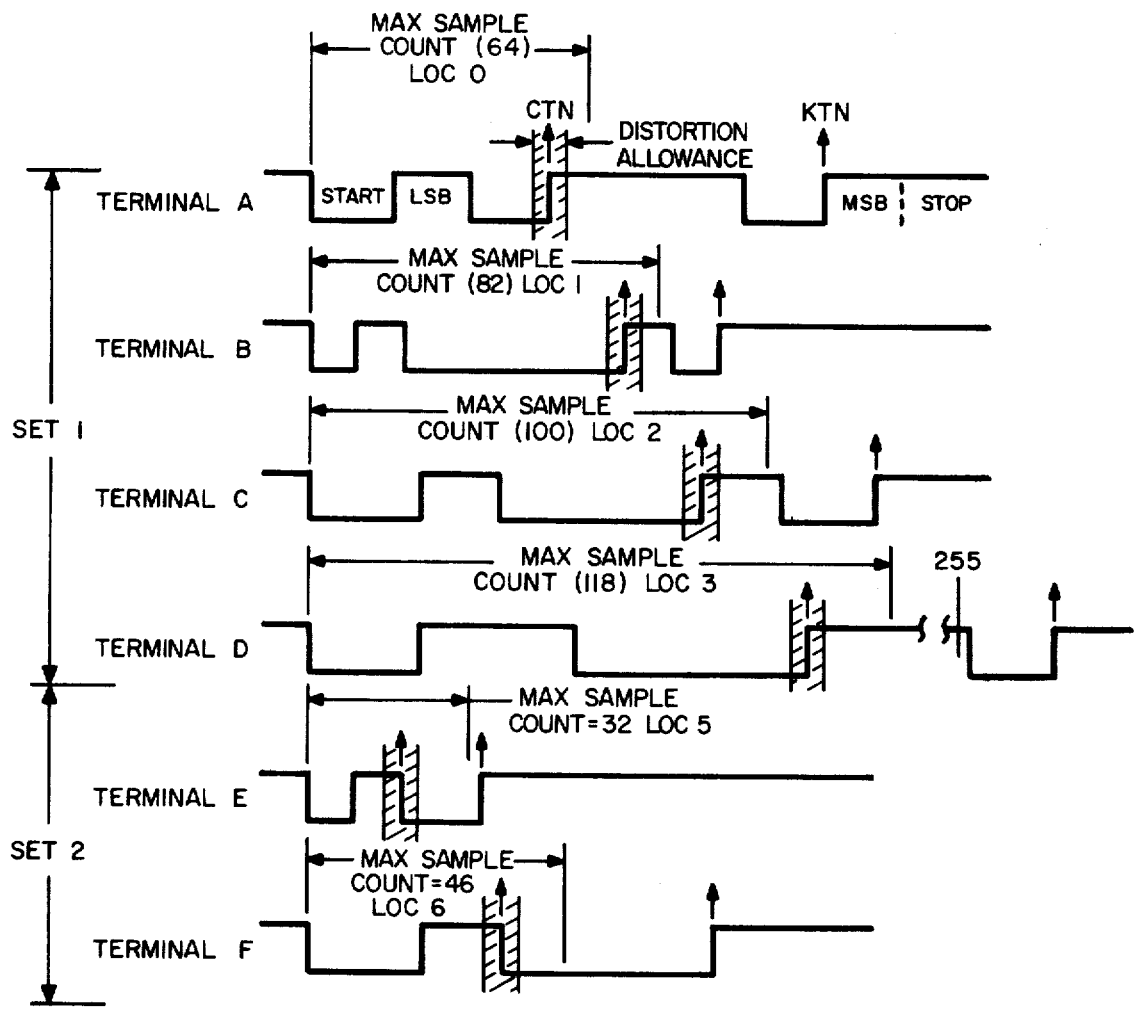
FIG. 15 is an illustration of exemplary Start Character waveforms are used to illustrate the exemplary ATLSD Table of Table M.

To further illustrate the design of an exemplary ATLSD Table, the first character waveforms of FIG. 15 and the corresponding ATLSD Table configuration of Table M are presented. In this illustrated embodiment there are two sets of LTs — Set 1 consisting of LTs A, B, C, and D and Set 2 consisting of LTs E and F. For Set 1, ATLSD byte 2 — see FIG. 7 — is loaded with $CTN = 3$, $KTN = 5$ and ATLSD byte 3 is loaded with a 0, i.e., ATLSD Table addressable location 0. For Set 2, ATLSD byte 2 is loaded with $CTN = 2$, $KTN = 3$ and ATLSD byte 3 is loaded with a 5, i.e., ATLSD Table addressable location 5. Note that Error Detect denotes an error condition with ATLSD Table addressable locations 4 and 7–15 not to be entered unless an error condition has been determined.

TABLE L

| LINE TERMINAL TYPE | MIN/ MAX COUNT | ATLSD TABLE MAX SAMPLE COUNT (Byte 1)* | ATLSD TABLE ADDRESS LOCATION |
|---|---|---|---|
| DCT 500 at 300 baud | 23.67 29.67 | 32 | 0 |
| DCT 500 at 150 baud | 34.00 46.00 | 46 | 1 |
| TTY 37 at 150 baud | 47.33 59.33 | 64 | 2 |
| IBM 2741 at 134.5 baud | 67.66 81.04 | 82 | 3 |
| DCT 500 at 110 baud | 82.73 99.09 | 100 | 4 |
| TTY 33 at 110 baud | 100.91 117.27 | 118 | 5 |
| | | 0 | 6 |

*Interpolate and round, for example:

$$\text{Byte 1} = 29.67 + \frac{34.0 - 29.67}{2} = 31.835 \longrightarrow 32.0$$

TABLE M

| | LT TYPE | ATLSD TABLE ADDRESS LOCATION | BYTE 1 MAX SAMPLE COUNT | BYTE 2 LT CHARACTERISTICS AND LINE SPEED | BYTE 3 |
|---|---|---|---|---|---|
| SET 1 → ENTRY | A | 0 | 64 | BYTE 2 | BYTE 3 |
| | B | 1 | 82 | BYTE 2 | BYTE 3 |
| | C | 2 | 100 | BYTE 2 | BYTE 3 |
| | D | 3 | 118 | BYTE 2 | BYTE 3 |
| | ERROR DETECT | 4 | 0 | 0 | 0 |

TABLE M-continued

|  | LT TYPE | ATLSD TABLE ADDRESS LOCATION | BYTE 1 MAX SAMPLE COUNT | BYTE 2 LT CHARACTERISTICS AND LINE SPEED | BYTE 3 |
| --- | --- | --- | --- | --- | --- |
| SET 2 ENTRY → | E | 5 | 32 | BYTE 2 | BYTE 3 |
|  | F | 6 | 46 | BYTE 2 | BYTE 3 |
|  | ERROR DETECT | 7 | 0 | 0 | 0 |
|  | ERROR DETECT | 15 | 0 | 0 | 0 |

Note also that an error condition is defined by ATLSD bytes 2, 3 = 0; however, bit 5 of ATLSD byte 3 should be a 1 if all other bits are 0's.

Discussion of ATLSD System and Method of Operation

Figure 16A:
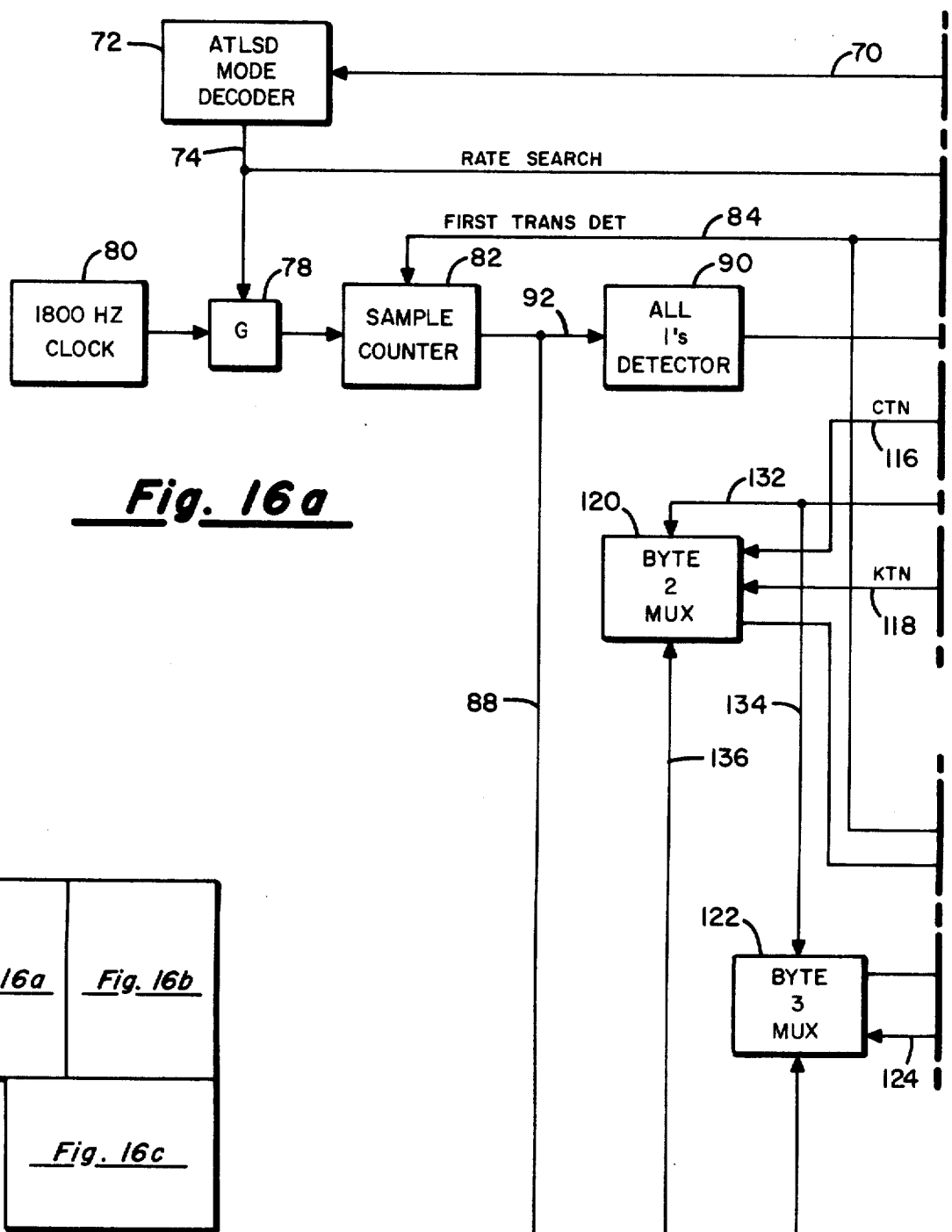
FIG. 16, comprised of FIGS. 16a, 16b and 16c, is a functional block diagram of the ATLSD of the present invention.
Figure 16:
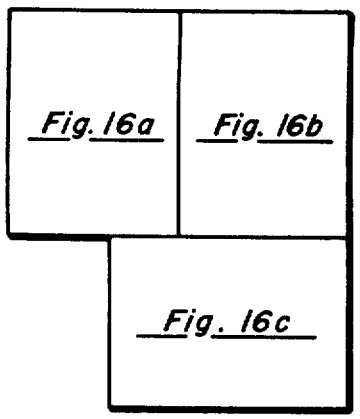
Figure 16B:
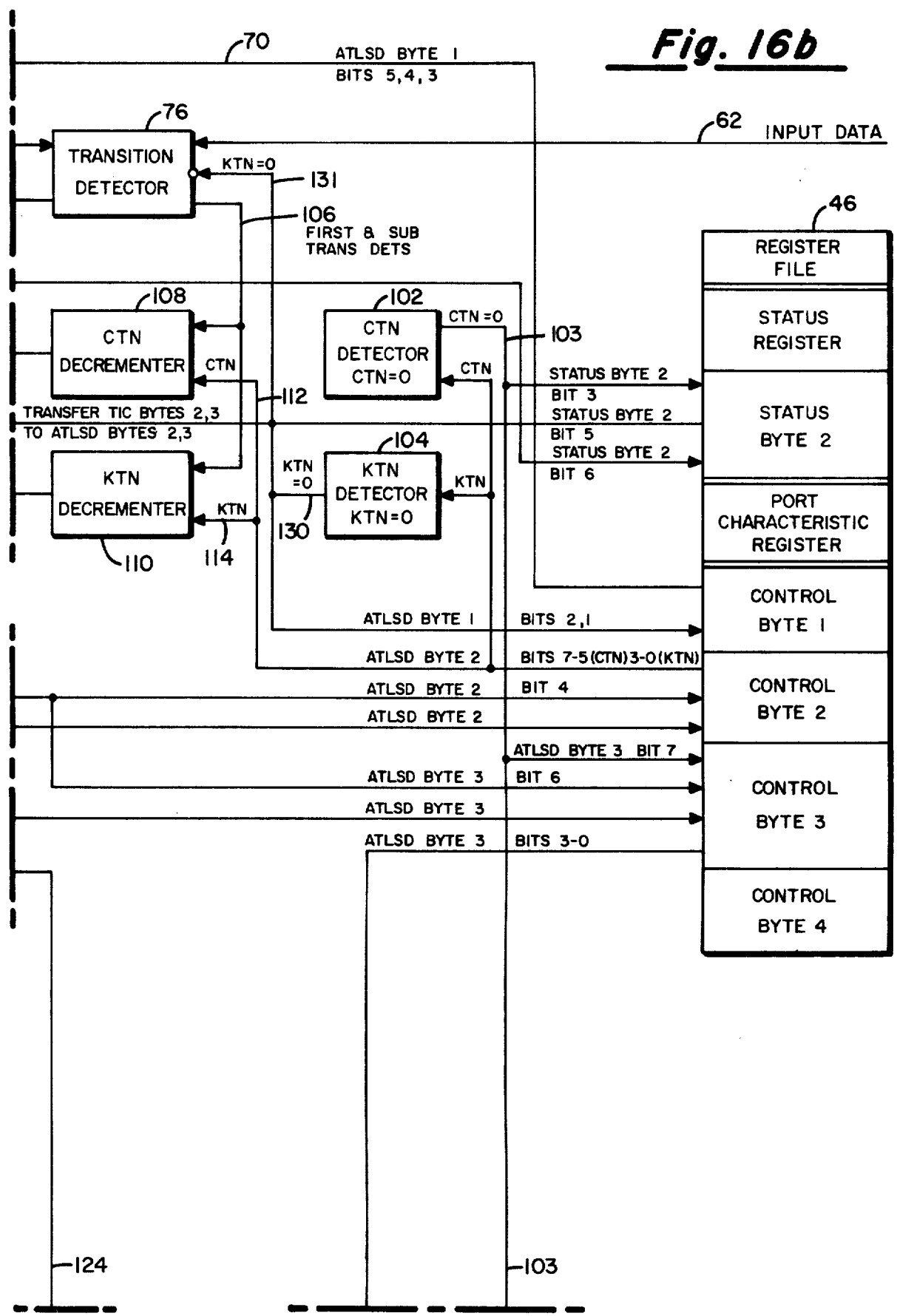
Figure 16C:
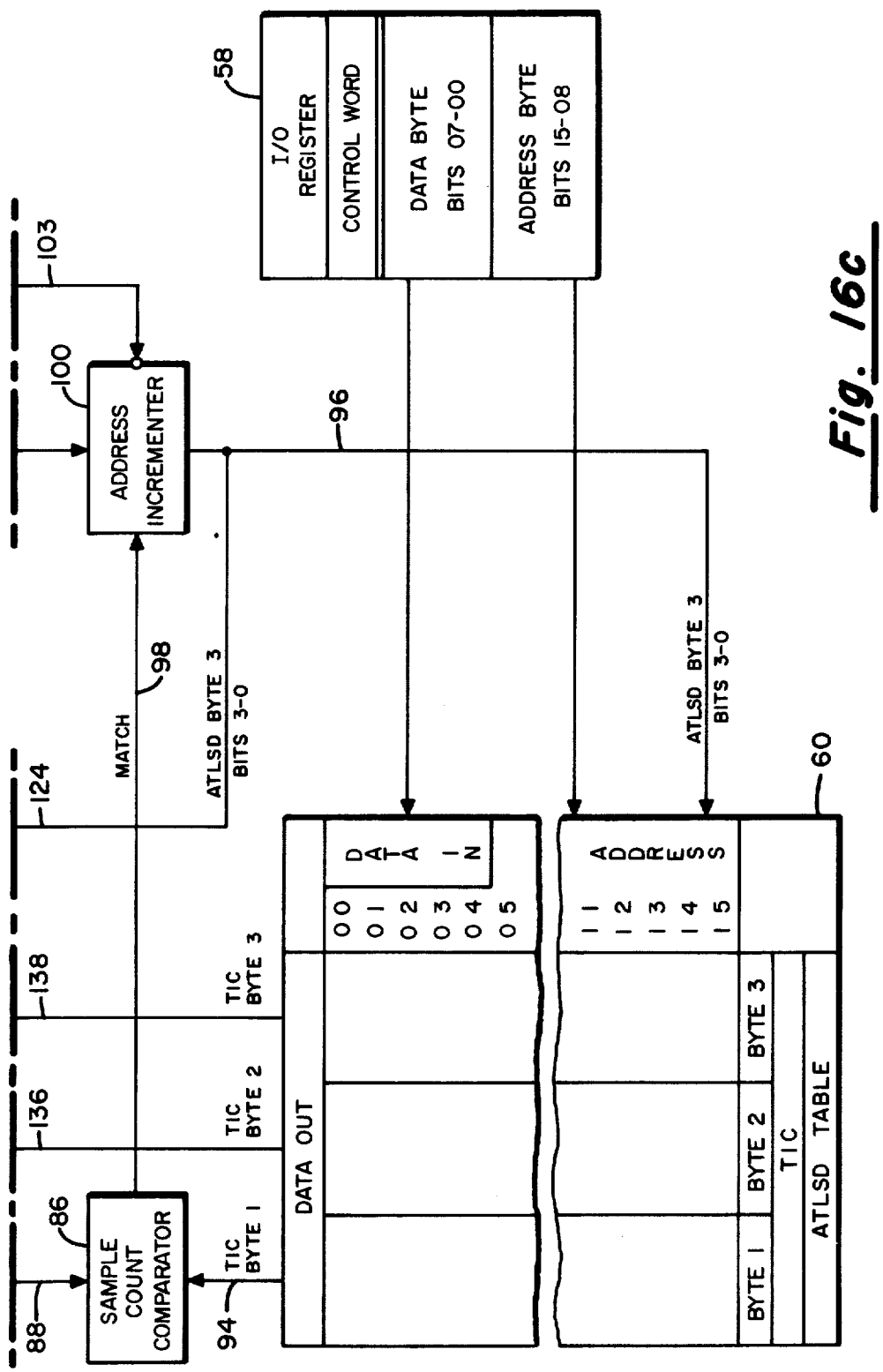
Figure 17:
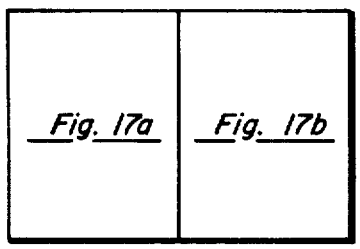
FIG. 17, comprised of FIGS. 17a and 17b, is a flow diagram of the ATLSD operation of the present invention.
Figure 18:
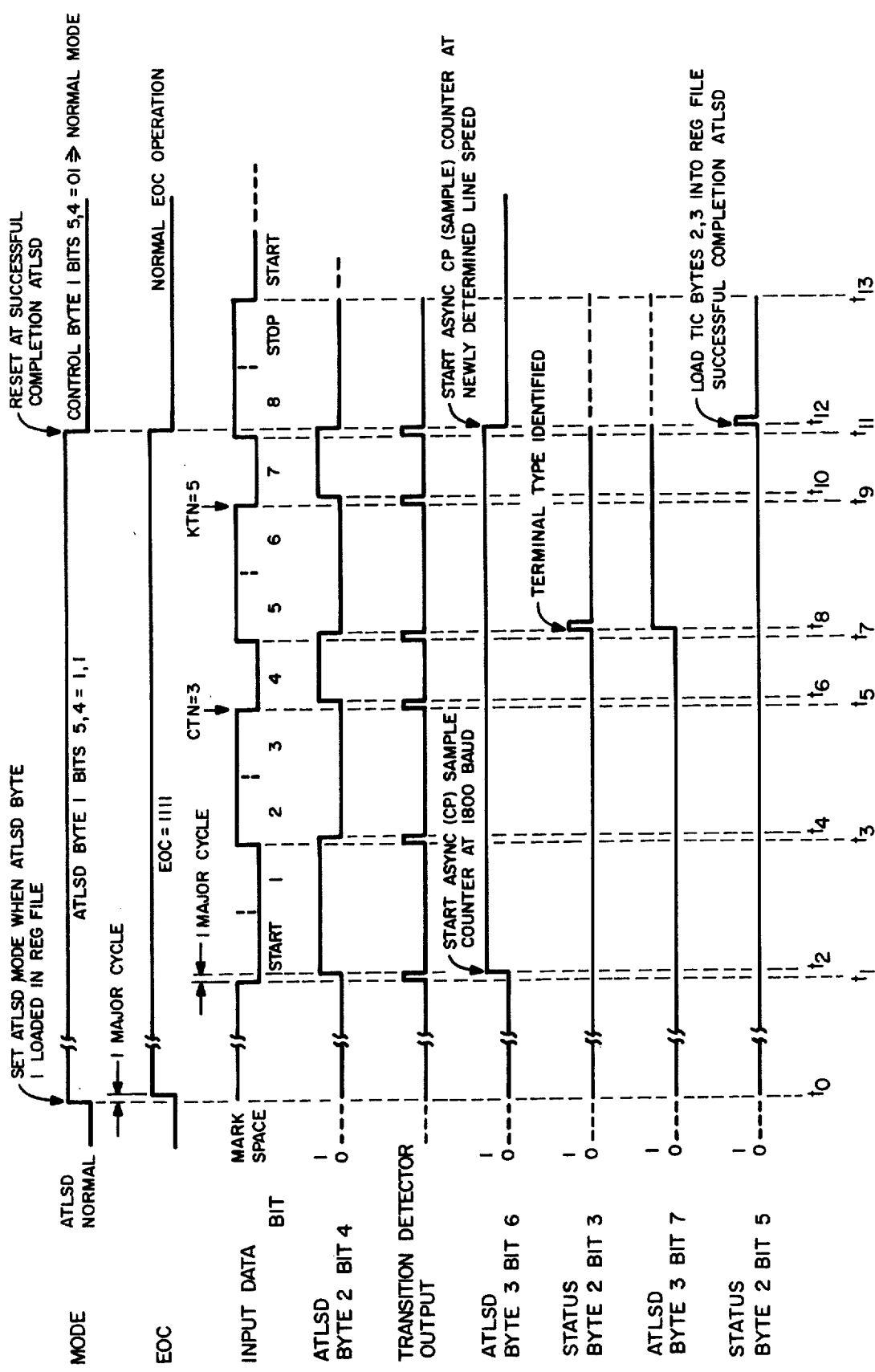
FIG. 18 is an illustration of a typical timing diagram for an ATLSD operation illustrated in the flow diagram of FIG. 17.
Figure 21A:
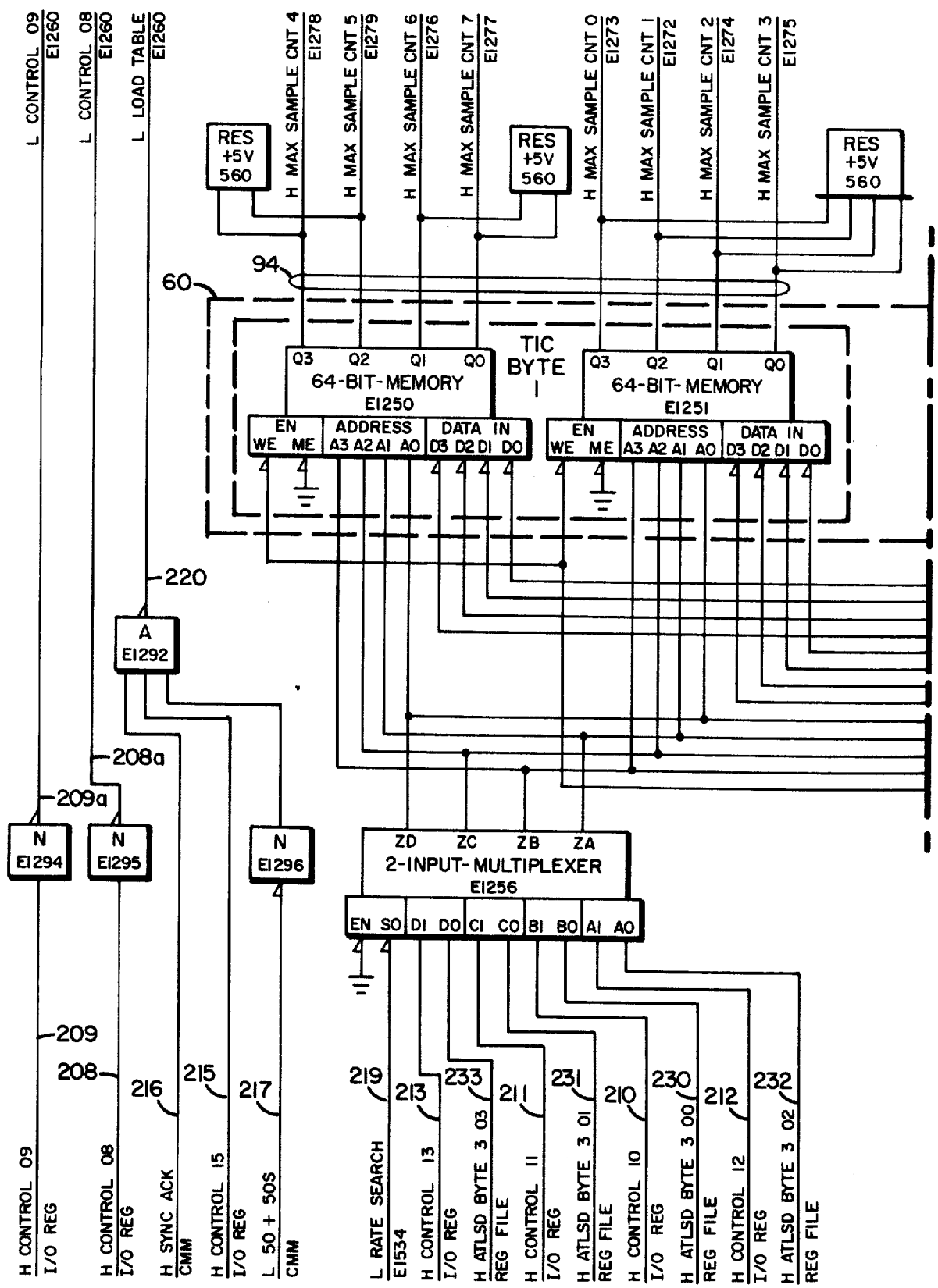
Figure 21B:
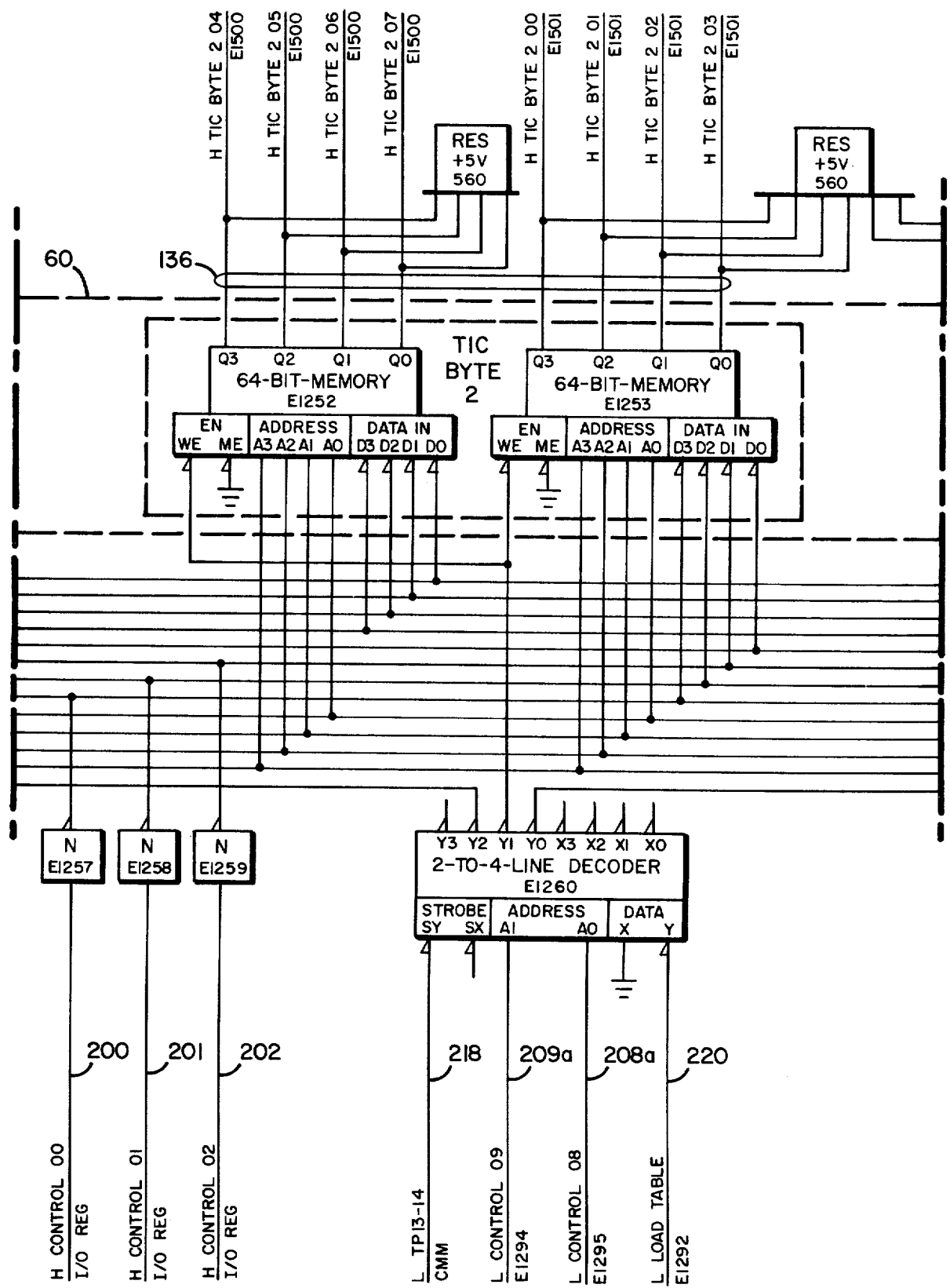
Figure 21C:
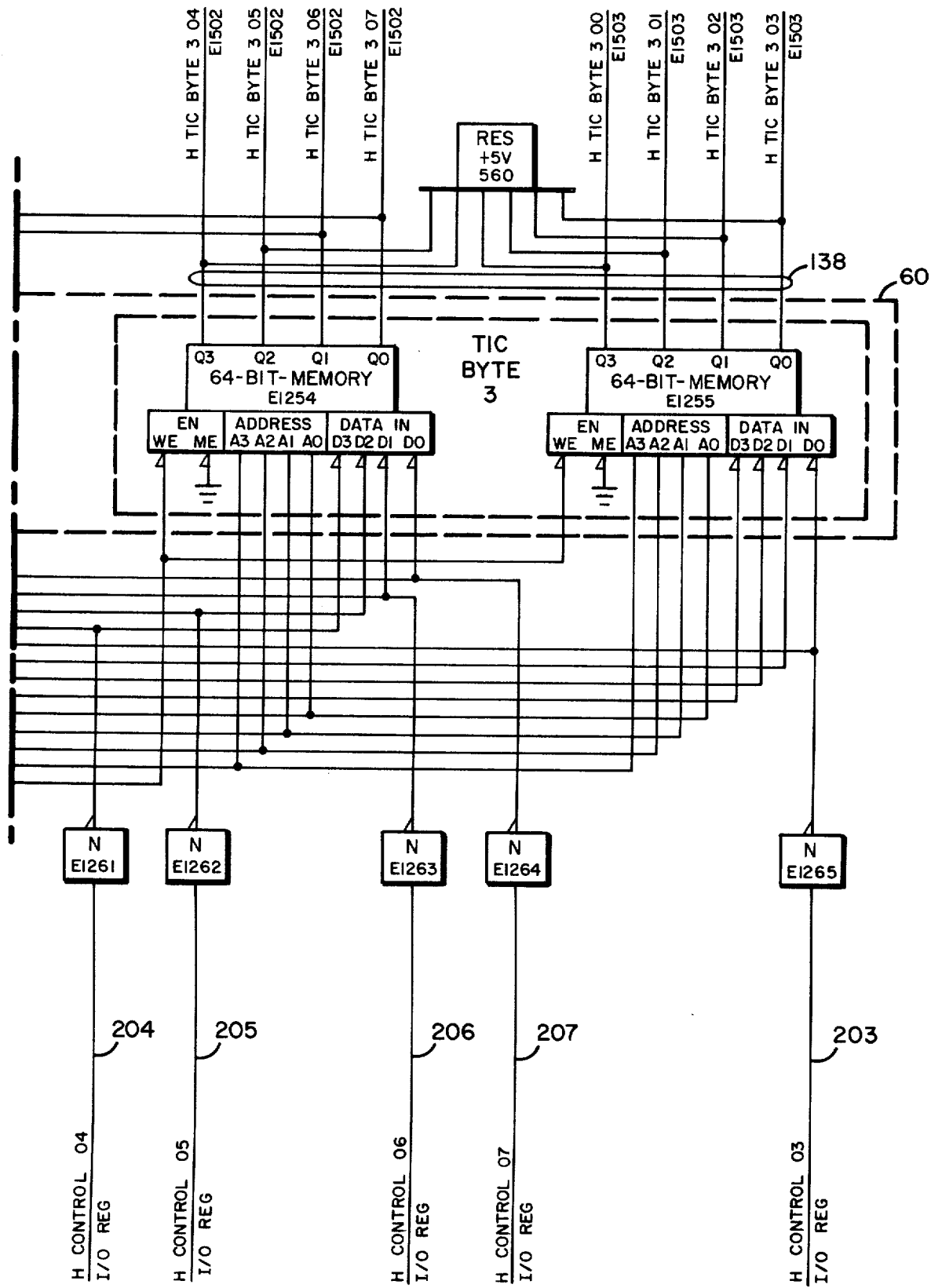

With particular reference to FIG. 16 there is presented a functional block diagram of the ATLSD of the present invention. With particular reference to FIG. 17 there is presented a flow diagram of the sequence of steps in the operation of the ATLSD, while FIG. 18 illustrates a typical timing diagram for an ATLSD operation wherein, e.g., CTN = 3, KTN = 5. Prior to discussing an ATLSD operation in detail, a summary of a typical ATLSD operation shall be given:

1. Prior to initializing an ATLSD operation, CP 10 must load ATLSD bytes 2, 3 and 4 — see FIG. 7 — into Control bytes 2, 3 and 4 (of the port characteristic register) of register file 46.

2. Next CP 10 activates the ATLSD operation by loading ATLSD byte 1 — see FIG. 7 — into Control byte 1 of register file 46. Note: Because ATLSD bytes 1, 2, 3 and 4 of FIG. 7 are used only during the monitoring of the first character during an ATLSD operation, in FIG. 16 the port characteristic register of register file 46 is used to illustrate the condition of Control bytes 1, 2, 3 and 4 only during the ATLSD operation.

3. When Step 2 above is completed, the ATLSD immediately starts looking for a Mark to Space transition and upon its detection of the initial Mark to Space transition caused by the Start bit of the first character the ATLSD activates an 8-bit sample counter that is driven by an 1800 Hz clocking signal. Also upon the detection of the first signal transition the ATLSD sets the ATLSD byte 2 bit 4 in Control byte 2 of register file 46 to a 1 and sets the ATLSD byte 3 bit 6 in Control byte 2 of register file 46 to a 1. Thereafter ATLSD byte 2 bit 4 follows the input data waveform of the first character, but delayed one major cycle.

4. Using the sample counter as a real-time reference, the ATLSD searches the ATLSD Table for a maximum sample count range that corresponds to the output of the sample counter. The search of the ATLSD Table is started at the TIC byte 1 that is stored at addressable location 0 of the ATLSD Table and progresses through the addressable locations of the ATLSD Table until either a Match condition, when CTN = 0, is found or until the TIC byte 1 at the last searched addressable location in the ATLSD Table contains all 0's indicative of an error condition — see Table M.

5. When the CTN related maximum sample count range within the ATLSD Table, or a Match condition, is determined, i.e., CTN = 0, the ATLSD Sets ATLSD byte 3 bit 7 in the Control byte 3 of register file 46 to a 1, Sets Status byte 2 bit 3 in the Status byte 2 of register file 46 to a 1.

This generates a Terminal Type Identified signal — see FIG. 20.

6. When the KTN is determined, i.e., KTN = 0, the ATLSD

Sets ATLSD byte 1 bits 5, 4 of the Control byte 1 of register file 46 to 0, 1, respectively.

Sets Status byte 2 bits 6, 5, 3 of the Status byte 2 of register file 46 to 0, 1, X, respectively.

This generates a Successful Completion of ATLSD signal — see FIG. 20.

7. If no Match condition is determined, i.e., if no CTN related maximum sample count within the ATLSD Table is found, i.e., CTN ≠ 0, the ATLSD Sets Status byte bits 6, 5, 3 of the Status byte 2 of register file 46 to 1, X, X, respectively, and generates an Unsuccessful Completion of ATLSD signal - see FIG. 20.

Sets ATLSD byte 1 bits 5, 4 of the Control byte 1 of register file 46 to 0, 0, respectively, generating a Line Off signal.

8. After the KTN of Step 6 above has been determined and the ATLSD byte 1 bits 5, 4 of the Control byte 1 of register file 46 have been set to 0, 1 and the Status byte 2 bits 6, 5, 3 of the Status byte 2 of register file 46 have been set to 0, 1, X, respectively, the generated Successful Completion of ATLSD signal transfers TIC bytes 2, 3, from the addressable location in ATLSD Table that corresponds to the Match condition, i.e., CTN = 0, to Control bytes 2, 3 of register file 46 and initiates the normal Data Input operation inputting the second and subsequent characters at the line speed stipulated by TIC bytes 2, 3.

Discussion of Functional Block Diagram

With reference to the ATLSD of FIG. 16, the ATLSD receives, bit-serially, on line 62, a first character from a transmitting LT and, under control of information held in Control bytes 1, 2, 3 and 4 of register file 46 provides in Control bytes 2, 3 of register file 46 the terminal characteristics and line speed of the transmitting LT. As an essential feature of the determination of the terminal characteristics and line speed of the transmitting LT, the ATLSD includes an ATLSD Table 60 which is comprised of 16 24-bit terminal identification characters (TICs), each of the 16 TICs being comprised of three TIC bytes 1, 2, 3, each of which TIC bytes is comprised of 8 bits 7-0 and have the format as illustrated in FIG. 6. TIC byte 1 contains a binary word that represents the maximum sample count of the range for a particular first character that is received from an LT, the terminal characteristics and line speed of which are to be determined. The minimum maximum sample count of the range of sample counts that are stored in the address locations of ATLSD Table 60 is normally 1 with the maximum sample counts stored in an ascending order of word addressable locations. TIC bytes 2 and 3 define the terminal characteristics and line speed of the LT that is associated with the maximum sample count that is stored in the associated TIC byte 1, all of the same ATLSD Table 60 address location. The determination of the particular bit configuration of the TICs that are stored in ATLSD Table 60 is discussed in detail hereinabove with particular reference to the discussion under paragraph heading Construction of ATLSD Table and with particular reference to Tables A-M and FIGS. 9–14. Accordingly, no further discussion of the construction of ATLSD Table 60 will be had.

As stated hereinabove, the ATLSD requires that the systems programmer must priorly know the terminal characteristics and line speeds of all of the LTs that may be coupled to each separate one of all of the 128 ports or communication lines that are a part of the real-time data processing system into which the ATLSD is incorporated. From this knowledge, the systems programmer then, for each different set of LTs that may be associated with a particular port, establishes a group of multibit first characters and then, the corresponding terminal characteristics and line speeds of the particular LTs concerned. From this information, the systems programmer then designs the set of TICs that define the LTs concerned. The TICs are then priorly loaded into ATLSD Table 60 via I/O Register 58 and a Load ATLSD Table signal using a Write 50 control word having the format of FIG. 19. TIC bytes 1, 2, 3, as specified by Write 50 bits 7-0 are loaded into the associated ATLSD Table 60 address location as determined by the ATLSD Table byte number and location address that are specified in Write 50 bits 9, 8 and 15-10, respectively. Once ATLSD Table 60 has been loaded with the properly defined TICs, the ATLSD operation may be performed.

To initiate an ATLSD operation, the associated system must load the port characteristic area of register file 46 with the ATLSD byte formats illustrated in FIG. 7, which ATLSD byte formats are utilized only for the monitoring of the first character that is bit-serially received on input data line 62. Initially, ATLSD byte 2 is loaded into Control byte 2 for storing the count transition number (CTN) and the character transition number (KTN) therein while ATLSD byte 3 is loaded into Control byte 3 of register file 46 for storing the starting address location of ATLSD Table 60 therein while ATLSD byte 4 is loaded into Control byte 4 of register file 46 for storing the asynchronous clock coding therein. Next, in Control byte 1 of register file 46, ATLSD byte 1 is stored therein, which ATLSD byte 1 includes the necessary bit configuration to initiate the ATLSD Mode signal which signal operates to activate the ATLSD operation.

With ATLSD byte 1 in Control byte 1 of register file 46, bits 5, 4, 2 via line 70 activate ATLSD Mode decoder 72, causing a Rate Search signal, via line 74, to be coupled to transition detector 76; the Rate Search signal also, via gate 78, couples the 1800 Hz clock signal from the clock source 80 to the 8-bit sample counter 82. Transition detector 76 starts detecting the signal transitions from Mark to Space and from Space to Mark as determined by the input data waveform of the incoming first character on line 62. Upon the detection of the first Mark to Space transition caused by the initial Start bit — see FIG. 8 — sample counter 82 is energized causing it to generate an 8-bit real-time sample count. The first transition detect signal, via line 84, enables sample counter 82 to be incremented one sample count approximately every 0.5 milliseconds (ms) as determined by 1800 Hz clock source 80. This current sample count is coupled to sample count comparator 86 via line 88 and to all 1's detector 90 via line 92.

At this time then, upon the detection of the first signal transition by transition detector 76, sample count comparator 86 starts comparing the current sample count, as provided by sample counter 82, via line 88, to the current maximum sample count, via line 94, that is stored in TIC byte 1 of the starting address location in ATLSD Table 60 as addressed, via line 96, by ATLSD byte 3 bits 3-0 stored in Control byte 3 of register file 46. When the current sample count obtained from sample counter 82 equals the current maximum sample count obtained from ATLSD Table 60, a Match signal, via line 98 and address incrementer 100, increments the current address location in ATLSD Table 60 by 1 to search on or compare to the next higher maximum sample count stored in TIC byte 1 of the next higher and new current address location.

Also at this same time, i.e., upon the detection of the first signal transition by transition detector 76, all 1's detector 90 starts testing the 8-bit output of sample counter 82 for all 1's. This all 1's detect signal if reached prior to the time that CTN = 0 (as determined by CTN detector 102) sets Status byte 2 bit 6 in Status byte 2 of register file 46 to 1 — the setting of Status byte 2 bit 6 determines an Unsuccessful ATLSD operation signal to be generated as a status code — see FIG. 20. Upon the detection of each signal transition beginning with the first signal transition of the first Mark to Space transition that is caused by the initial Start bit, the transition detect signal from transition detector 76, via line 106, decrements the CTN, in CTN Decrementer 108, and decrements the KTN, in KTN Decrementer 110, as obtained from ATLSD byte 2 in Control byte 2 of register file 46 via lines 112 and 114, respectively. These decremented CTN and KTN are then, via lines 116 and 118, coupled to Byte 2 MUX 120 while the incremented ATLSD byte 3 bits 3-0 are then, via line 124, from address incrementer 100, coupled to Byte 3 MUX 122 to be stored in Control byte 2 of register file 46 as the new and current CTN and KTN and in Control byte 3 of register file 46 as the new and current ATLSD Table 60 address location.

After the new and current CTN and KTN have been decremented by CTN decrementer 108 and KTN decrementer 110 and stored in Control byte 2 of register file 46, CTN detector 102 and KTN detector 104 continuously test CTN and KTN to determine if they have been decremented to 0. When CTN detector 102 determines the CTN = 0, it generates a status signal that sets Status byte 2 bit 3 to a 1 and that sets ATLSD byte 3 bit 7 in Control byte 3 of register file 46 to a 1 — the setting of Status byte 2 bit 3 determines a Terminal Type Identified signal that is generated as a status code — see FIG. 20.

Transition detector 76 continues counting signal transitions and when KTN detector 104 determines that KTN = 0 it generates a status signal that sets Status byte 2 bit 5 to a 1 — the setting of this bit determines a Successful Completion of ATLSD operation signal that is generated as a status code — see FIG. 20. Now transition detector 76 is deactivated, via line 131, and, via line 132, Byte 2 MUX 120 and, via line 134, Byte 3 MUX 122 are caused to transfer from ATLSD Table 60 via lines 136 and 138, TIC bytes 2 and 3, of the current location address, to ATLSD bytes 2 and 3 in Control bytes 2 and 3 of register file 46. This completes the ATLSD operation with ATLSD bytes 2 and 3, which were formerly TIC bytes 2 and 3 in ATLSD Table 60, now specifying the terminal characteristics and line speed of the transmitting LT 16, 18 that transmitted the first character on line 62 and that is now about to transmit the second and subsequent characters that are to be processed by CP 10 at the now determined line speed.

Accordingly, as the bits of the first character are coupled, via line 62, bit-serially to transition detector 76, it enables sample counter 82 to count and store the total number of sample counts beginning with the detection of the initial Mark to Space transition caused by the Start bit and it enables CTN decrementer 108 and KTN decrementer 110 to decrement CTN to 0 and KTN to 0 one transition count upon the detection of each signal transition beginning with the detection of the first Space to Mark transition of the first character waveform.

The current CTN and KTN transition counts from ATLSD byte 2 of Control byte 2 in register file 46 are continuously being compared to 0 by CTN detector 102 and KTN detector 104. Also, sample counter 82 is continuously coupling the current sample count to sample count comparator 86 via line 88. Concurrently, with the starting address location in ATLSD Table 60 from ATLSD byte 3 in Control byte 3 of register file 46 being continuously coupled to addressing logic of ATLSD Table 60 via line 96, the current maximum sample count, as stored in TIC byte 1 of the TIC stored in the initial address location, e.g., 0, of ATLSD Table 60, is continuously being coupled to sample count comparator 86, via line 94. Accordingly, the current maximum sample count, via line 94, is being continuously compared to the current sample count, via line 88, in sample count comparator 86 until a Match condition, i.e., the condition when the current sample count equals the current maximum sample count in the TIC byte 1 that is being examined in ATLSD Table 60. Note: the term "continuously" is used although it is to be understood that the ATLSD operation, such as illustrated in FIG. 18, upon a given first character consists of a continuous series of time slice sampling of the associated port or communication line 28, 30 during successive major cycles, each individual time slice sampling period of the associated port being comprised of a single minor cycle — see FIG. 5.

When the current sample count equals the current maximum sample count, sample count comparator 86 generates an incrementing Match signal which, via line 98, increments, via address incrementer 100, the starting address location in ATLSD Table 60 as stored in ATLSD byte 3 in Control byte 3 of register file 46. Incrementing of the starting location address 0 in ATLSD byte 3 causes the new, incremented by 1, location address to be coupled thereto via line 96. Now, at this time, the maximum sample count stored in TIC byte 1 of ATLSD Table 60 address location 1 is, via line 94, coupled to sample count comparator 86 and compared therein to the current sample count being accumulated in sample counter 82. Accordingly, sample count comparator 86 continues incrementing the address location in ATLSD Table 60 until a Match condition (or, alternatively, an error condition) is achieved.

Using Table M and FIG. 18 as an illustrative example of the construction of ATLSD Table 60 with a starting address location in ATLSD Table 60 of 0 as determined by ATLSD byte 3 in Control byte 3 of register file 46, assume a CTN = 3 and a KTN = 5, such values being utilized for the construction of the TICs loaded in ATLSD Table 60 address locations 0, 1, 2, 3 and 4. Under these conditions, when CTN detector 102 determines that CTN = 0, it, via line 103, couples a CTN = 0 detect signal to and disables address incrementer 100. This disabling of address incrementer 100 upon the determination, by CTN detector 102, that the CTN of the sampled first character has been detected, i.e., that CTN = 0, disables the incrementing of the address location in ATLSD Table 60 that is stored in ATLSD Mode byte 3 in Control byte 3 of register file 46. Thus, at this time, ATLSD 60 has, by the determination of the proper address location in ATLSD Table 60 in which the not exceeded current maximum sample count is stored, as in TIC byte 1, has in the associated TIC bytes 2 and 3 determined the terminal characteristics and line speed of the transmitting LT from which the sampled first character on line 62 has been bit-serially received.

Transition detector 76 has, however, continued its function of decrementing the current KTN that is coupled to KTN decrementer 110 via line 114. Upon a determination that KTN = 0, i.e., that the last signal transition of the first character on line 62 has been detected, KTN detector 104 couples a KTN = 0 detect signal to line 130 which KTN = 0 detect signal via line 131 disables transition detector 76. Additionally, the KTN = 0 detect signal, via line 132, enables the transfer of TIC bytes 2, 3 of the TIC that is stored in the ATLSD Table 60 address location that is currently specified by ATLSD Mode byte 3 in Control byte 3 of register file 46, into ATLSD bytes 2, 3 in Control bytes 2, 3 of register file 46. At this time, the ATLSD operation is completed with the terminal characteristics and line speed as defined by ATLSD bytes 2, 3 in Control bytes 2, 3 of register file 46 being coupled to the associated system into which the ATLSD is incorporated for setting up the associated logic of CMM 12 prior to receipt of the second character, i.e., the character next following the first character, that is to be next received from the transmitting LT 16, 18 whose terminal characteristics and line speed have now been determined by ATLSD Table 60.

Discussion of Detail Logic Diagrams

With particular reference to FIGS. 21, 22, 23, 24 and 25, there are illustrated the detail logic diagrams of the ATLSD that is functionally illustrated in the functional block diagram of FIG. 16. The ALTSD of the present invention utilizes the 7400 Series small scale integrated (SSI) and medium scale integrated (MSI) circuit chips in which the standard transistor-transistor-logic (TTL) definitions apply. Thus, in discussing the detail logic it is to be understood that a logic 1 ⇒ H ⇒ High ⇒ | while a logic 0 ⇒ L ⇒ Low ⇒ ⊣.

To better understand the operation of the detail logic diagrams it may be best to summarize the theory of operation of CMM 12 as it samples ports 9 through 127 and the associated LTs 16, 18 of FIG. 1. CMM 12 scans the 128 ports, i.e., I/O communication lines 28, 30, over a single major cycle — see FIG. 3 — while each separate one of the 128 ports is sampled over a single minor cycle — see FIG. 5 — with the contents of the one sampled port's associated port characteristics register of register file 46 being modified, as required, by CMM 12 internal logic. Thus, CMM 12 and, accordingly, the ALTSD which is a part thereof, cycles through all the 128 ports during one major cycle servicing each separate port as required according to the priority scheme of FIG. 3. During each minor cycle, when the servicing of the one sampled port takes place, the internal logic, including that of the ALTSD, samples the contents of the 1 of 128 sampled port's associated 1 of 128 port characteristics registers of register file 46 and performs the necessary modification thereon returning the so-modified contents back into the port characteristics register of register file 46 from which the unmodified contents had been sampled. Thus, each ALTSD operation requires several successive major cycles to perform its terminal characteristics and line speed determination. Accordingly, when interpreting the timing diagram of FIG. 18 it is to be understood that the ALTSD operation upon a given first character consists of a continuous series of time slice sampling of the associated port during successive major cycles, each individual time slice sampling of the associated port being comprised of a single minor cycle — see FIG. 5.

As stated hereinabove, with particular reference to FIG. 16, the ATLSD requires that the LTs concerned must be priorly loaded into ATLSD Table 60. This loading of ATLSD Table 60 is accomplished using I/O register 58 and the necessary control signals using a Write 50 control word having the format of FIG. 19. The contents of TIC bytes 1, 2, 3, as specified by Write 50 bits 7-0, are each separately loaded into the associated ATLSD Table address location as determined by the ATLSD Table TIC byte number and location address that are specified in Write 50 bits 9, 8 and 14-10, respectively.

Figure 21:
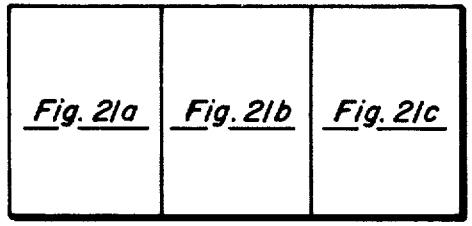
FIG. 21, comprised of FIGS. 21a, 21b and 21c, is a detailed logic diagram of the ATLSD Table and the associated logic for controlling the writing into and the reading out of the ATLSD Table of FIG. 16.
Figure 17A:
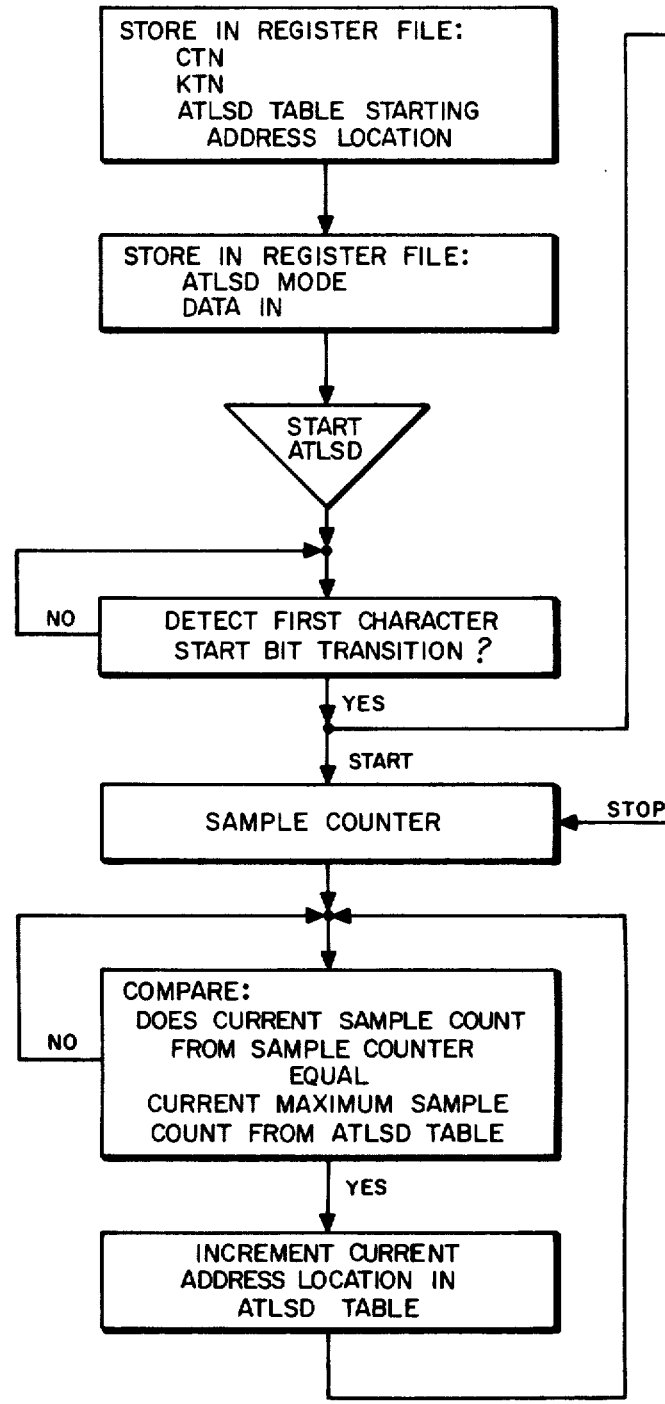
Figure 17B:
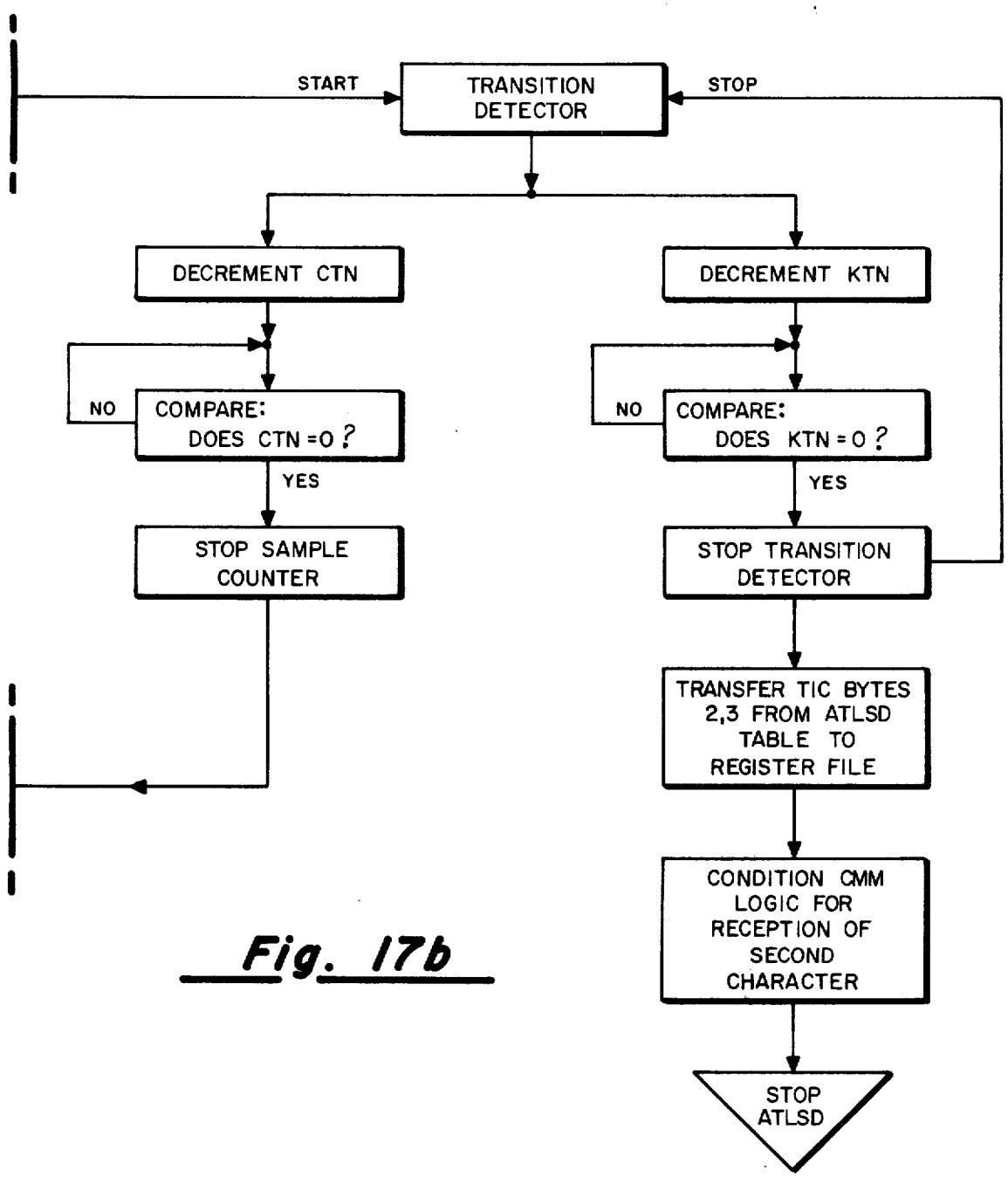

With particular reference to FIG. 21 there is provided the detail logic of ATLSD Table 60 and the necessary logic for controlling the writing into and the reading out of ATLSD Table 60. With the proper Write 50 control word stored in I/O register 58, data bits 00 through 07 are coupled to their associated input lines 200 through 207 and addressing bits 08 through 13 are coupled to their associated input lines 208 through 213. Now, with the proper control signals on lines 215 through 218 from CMM 12 and an L Rate Search signal from N E1534 of FIG. 22 on line 219, the data bits on lines 200 through 207 are loaded into the address location of ATLSD Table 60 that is specified by address bits 0 through 3 of ATLSD byte 3 via lines 230 through 233 from register file 46 or by the address bits 10 through 13 via lines 210 through 213 from I/O register 58. In this configuration, 2-to-4 line decoder E1260 functions to select or enable the one byte, i.e., TIC bytes 1, 2 or 3, of ATLSD Table 60 into which the eight data bits on lines 200 through 207 are to be stored while 2-input multiplexer E1256 functions to select the one of the two addresses specified by the address bits 10 through 13 from I/O register 58 or the ATLSD byte 3 bits 0 through 3 from register file 46. Once the ATLSD Table 60 has been loaded with the properly defined TICs, the ATLSD operation may be performed.

Prior to initiating an ATLSD operation, the associated system into which the ATLSD is incorporated must load the sampled port's associated port characteristic register (Control bytes 1, 2, 3, 4) of register file 46 with the ATLSD byte format illustrated in FIG. 7. Initially, ATLSD byte 2 is loaded into Control byte 2 of register file 46 for storing the count transition number (CTN) and the character transition number (KTN) therein while ATLSD byte 3 is loaded into Control byte 3 of register file 46 for storing the starting address location of ATLSD Table 6 therein and while ATLSD byte 4 is loaded into Control byte 4 of register file 46 for setting the asynchronous clock coding therein. Next, ATLSD byte 1 is stored in Control byte 1 of register file 46, which ATLSD byte 1 includes the necessary bit configuration to initiate the ATLSD Mode signal which signal operates to activate the ATLSD operation.

Figure 22A:
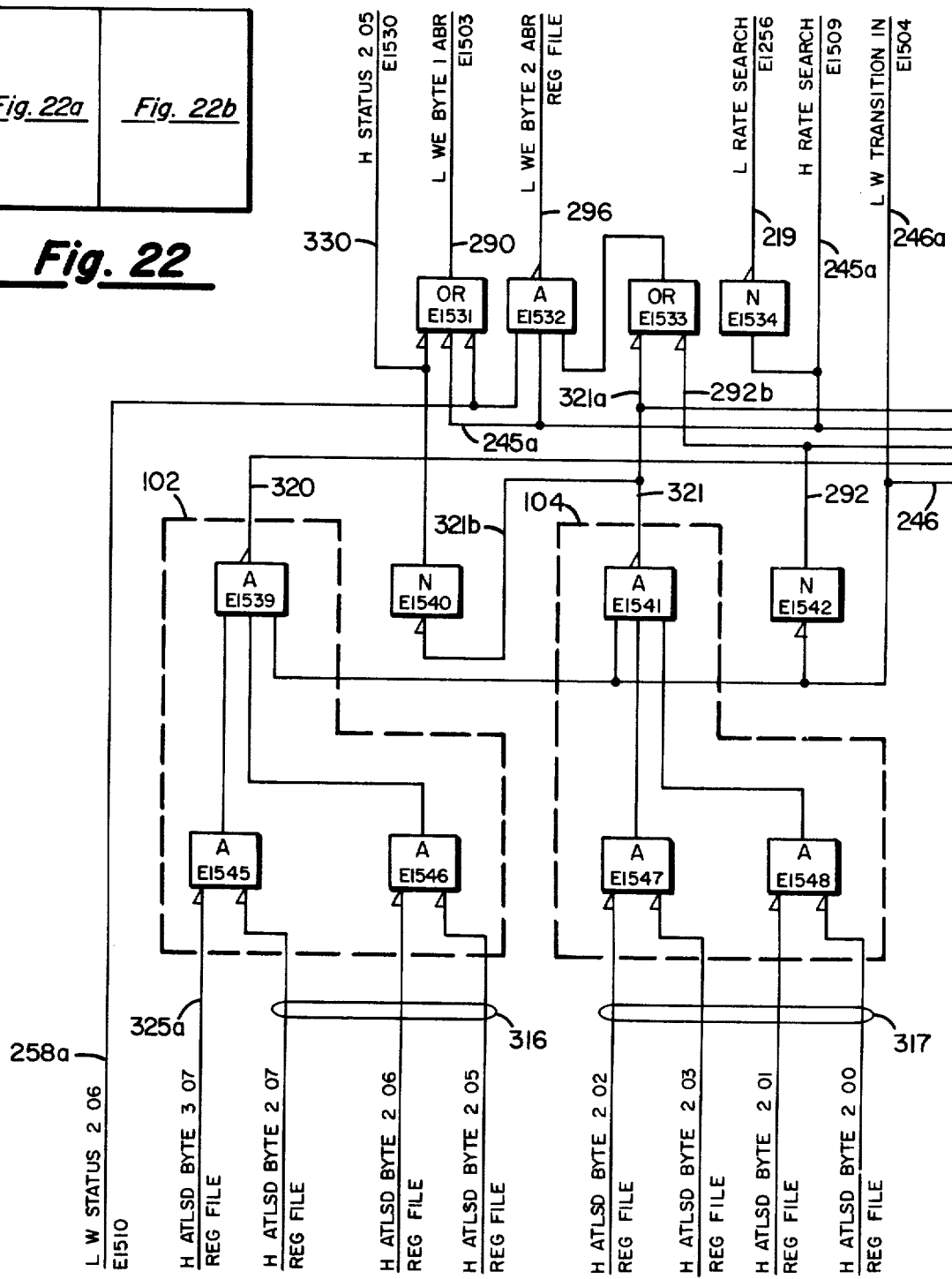
FIG. 22, comprised of FIGS. 22a and 22b, is a detailed logic diagram of the CTN detector, the KTN detector, the transition detector and the ATLSD Mode decoder and the associated logic of FIG. 16.
Figure 22B:
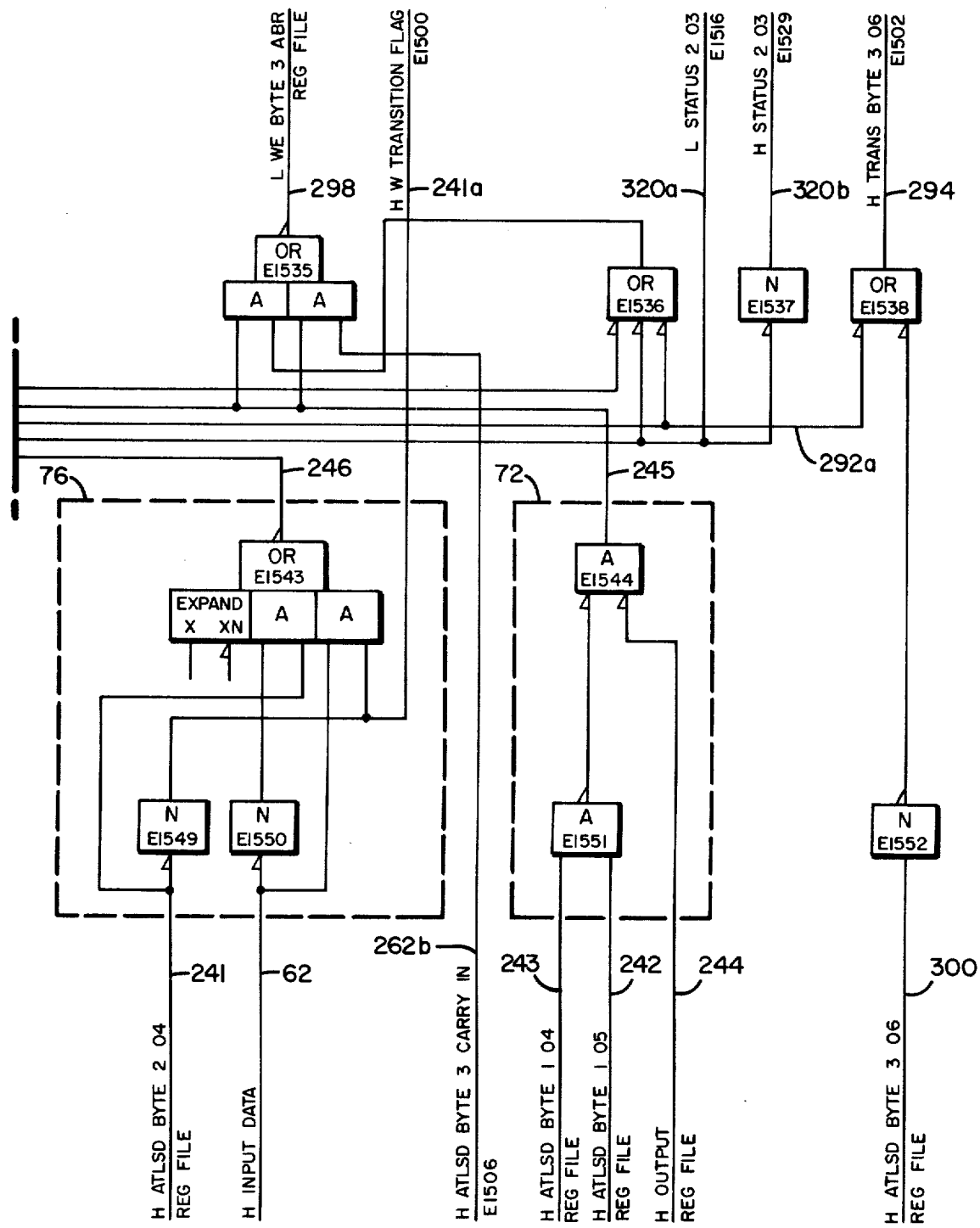
Figure 23A:
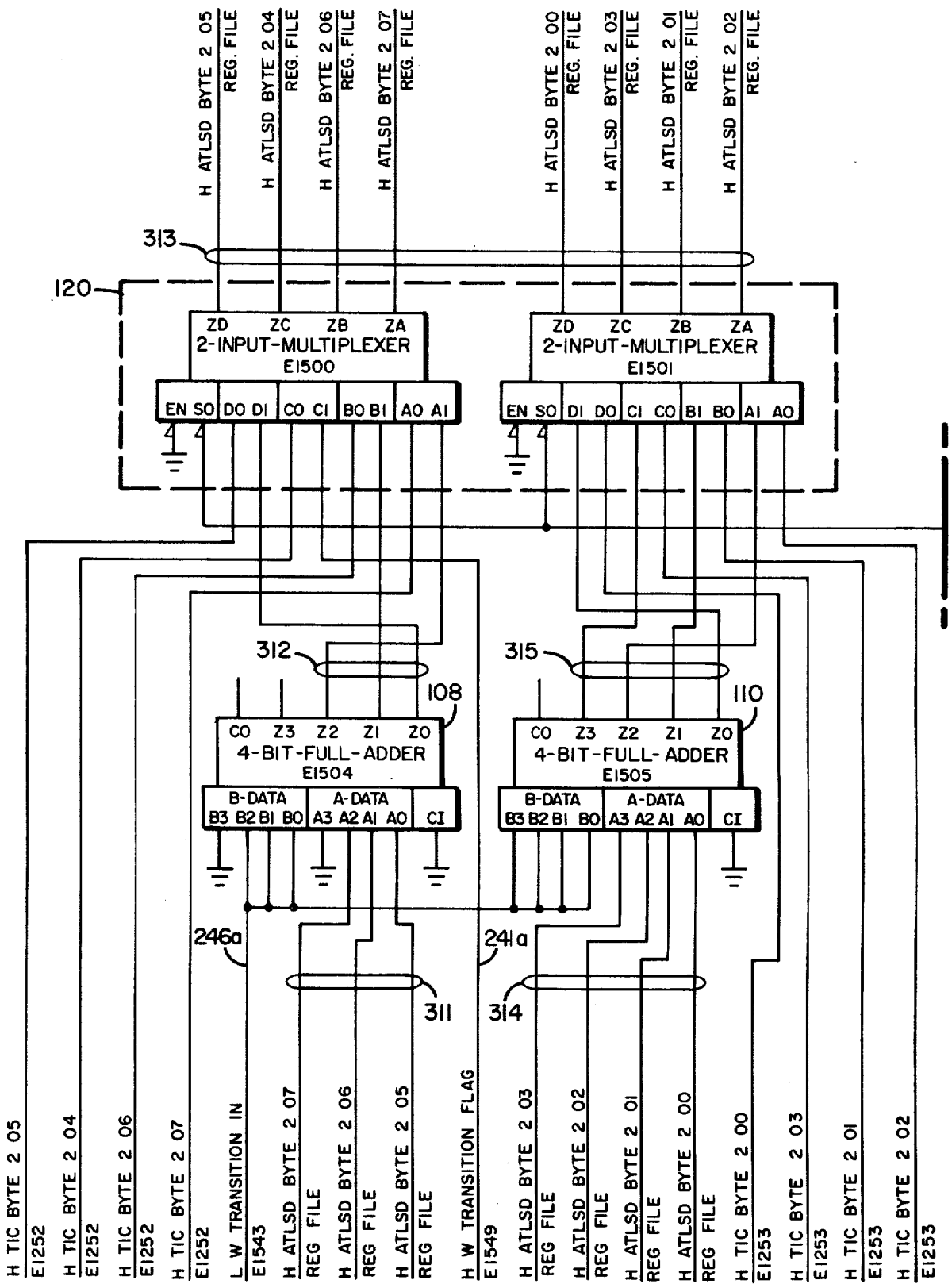
Figure 23B:
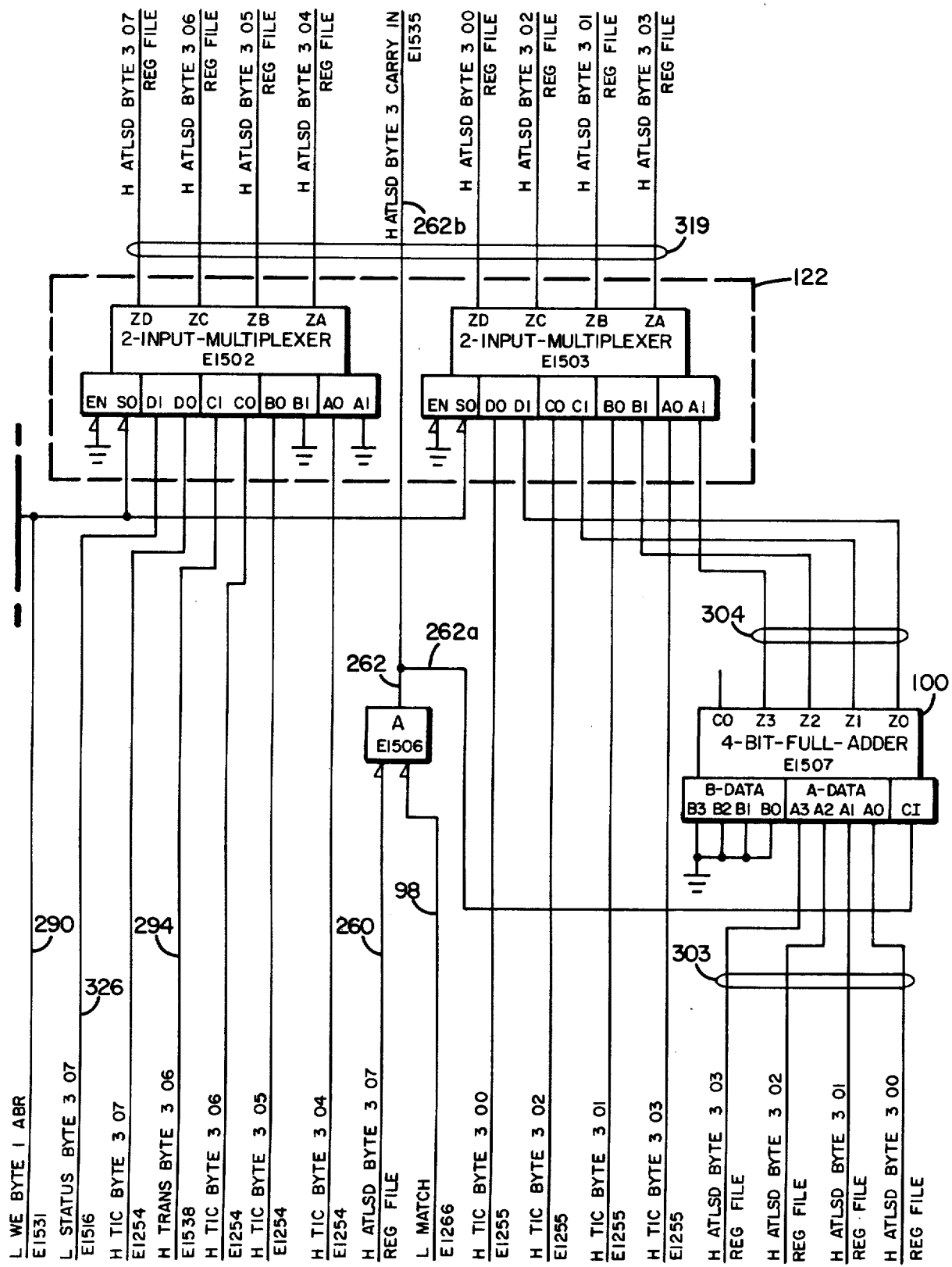

With ATLSD byte 1 bits 5, 4, 2 in register file 46 equal to 1, 1, 1, as at time $t_0$, the appropriate signal levels are coupled to lines 242, 243, 244 of FIG. 22 causing ATLSD Mode decoder 72 (comprised of ANDs E1544 and E1551) to generate and couple a Rate Search signal to line 245. Now, with the input data on input data line 62 being sampled for the first character that is to be received from the transmitting LT on the sampled port and with ATLSD byte 2 bit 4 from Control byte 2 of register file 46 on line 241 being initially set to a O → L signal — see FIG. 7 — the first signal transition that is caused by the Start bit is now ready to be detected by transition detector 76 — see FIG. 18.

Transition detector 76 (comprised of inverters (N) E1549 and E1550 and AND/OR E1543) functions as an Exclusive OR gate coupling to its output line 246 a transition detect H signal whenever the input data on line 62 and the ATLSD byte 2 bit 4 on line 241 are of the same signal level. The operation of the ATLSD is to provide as an input on line 241 from register file 46 an ATLSD byte 2 bit 4 signal that is an inverted version of the input data on line 62, but delayed one major cycle, e.g., if the sampled port is port 0 the delay is 17.36 us. If the transmitting LT on port 0 is transmitting at a line speed of 1200 baud, each bit would occupy approximately 0.83 ms. Accordingly, at the speeds involved the delay due to the major cycle time is negligible. Further, as the major cycle time determines the delay of the ATLSD byte 2 bit 4 signal on line 241 with respect to the input data on line 62, the transition detector 76 should produce, on its output line 246, a transition detect H signal of, e.g., 17.36 us pulse length when sampling, e.g., port O.

On the minor cycle during which the Start bit is coupled to line 62, as at time $t_1$, the input data waveform on line 62 is an L signal while concurrently ATLSD byte 2 bit 4 on line 241, from register file 46, is also an L signal. With both signals on lines 62 and 241 at the same L signal level, transition detector 76 couples a transition detect H signal to its output line 246. Concurrently, the inverse of the ATLSD byte 2 bit 4 L signal on line 241 is, via N E1549, coupled to line 241a as an H W Transition Flag signal and thence to Byte 2 MUX 120 (comprised of 2-input-multiplexers E1500 and E1501) — see FIG. 23 — for setting ATLSD byte 2 bit 4 in register file 46 to a 1 when gated therein by an L WE byte 1 ABR signal on line 290. Also at this time, the transition detect H signal on line 246 couples on line 246a an H W Transition IN signal to — see FIG. 23 — CTN decrementer 108 (comprised of 4-bit-full-adder E1504) and KTN decrementer 110 (comprised of 4-bit-full-adder E1505). They then provide on their output cables 312 and 315, as corresponding inputs to Byte 2 MUX 120, the decremented CTN AND KTN of the CTN and KTN from ATLSD byte 2 bits 7, 6, 5 and bits 3, 2, 1, 0 on cables 311 and 314, respectively, from Control byte 2 of register file 46. The decremented CTN and KTN are then, in turn, returned to Control byte 2 of register file 46 via cable 313.

Concurrently, the transition detect H signal on line 246 via N E1542, line 292a and OR E1538 couples an H Transition Byte 3 bit 6 signal via line 294 to Byte 3 MUX 122 (comprised of 2-input-multiplexers E1502 and E1503) for setting ATLSD byte 3 bit 6 in register file 46 when gated therein by an L WE byte 1 ABR signal on line 290.

At this time OR E1531 couples an L WE byte 1 ABR signal to line 290 and thence to Byte 2 MUX 120 and Byte 3 MUX 122. This L WE byte 1 ABR signal on line 290 enables ATLSD byte 2 and ATLSD byte 3 to be coupled into Byte 2 MUX 120 and Byte 3 MUX 122 (rather than TIC byte 2 and TIC byte 3 when WE byte 1 ABR signal is H). This enables the H W Transition Flag signal on line 241a and the H Transition byte 3 bit 6 on line 294 to be coupled into the respective bit positions of Byte 2 MUX 120 and Byte 3 MUX 122 for setting the respective ATLSD byte 2 bit 4 and ATLSD byte 3 bit 6 when gated into register file 46. Concurrently, AND E1532 and AND/OR E1535 couple L WE byte 2 ABR and L WE byte 3 ABR signals from their respective output lines 296 and 298 to Control byte 2 and Control byte 3 of register file 46 enabling the output of Byte 2 MUX 120, via cable 313, and Byte 3 MUX 122, via cable 319, to be loaded into Control byte 2 and Control byte 3 of register file 46. At this time then, i.e., at the termination of the transition detect H signal, as at time $t_2$, ATLSD byte 2 bit 4 and ATLSD byte 3 bit 6 have been set to 1's in Control byte 2 and Control byte 3 of register file 46 while the decremented by 1 CTN and KTN have been loaded into Control byte 2 of register file 46.

After the termination of the first major cycle during which the first signal transition due to the Star bit was detected, and the start of the next subsequent major cycle, as at time $t_2$, the H ATLSD byte 2 bit 4 and the H ATLSD byte 3 bit 6 from register file 46 are coupled to their respective input lines 241 and 300 — see FIG. 22. With ATLSD byte 2 bit 4 now an H signal while the input data signal due to the Start bit is still an L signal, transition detector 76 couples a transition detect L signal to its output line 246 establishing the pulse length of the positive transition detect H signal. Concurrently with ATLSD byte 3 bit 6 on line 300 being an H signal it, via N E1552 and OR E1538 couples an H transition byte 3 bit 6 signal to its output line 294 and thence to Byte 3 MUX 122 — see FIG. 23 — ensuring that ATLSD byte 3 bit 6 will remain set to a 1 in register file 46 during the remainder of the ATLSD operation. The setting of ATLSD byte 3 bit 6 in register file 46 then, via line 300a — see FIG. 24 — enables gate 78 (comprised of AND E1509) coupling the 1800 Hz output of oscillator 80 (comprised of oscillator E1508) to the 8-bit sample counter 82 (comprised of 8-bit counter E1512). The output of sample counter 82 is, via its 8 output lines of cable 304, coupled — see FIG. 25 — to all 1's detector 90 (comprised of AND E1271) and to sample count comparator 86. All 1's detector 90 is utilized to determine when sample counter 82 has counted to its maximum sample count of, e.g., 255 and thence — see FIG. 24 — via line 256, N E1517 and AND E1510, to enable the generation of an L W Status byte 2 bit 6 signal on line 258 which sets the Status byte 2 bit 6 of register file 46 to a 1 indicating that an Unsuccessful ATLSD operation has been performed — see FIG. 20.

Sample count comparator 86 is utilized to compare bit-by-bit the current maximum sample count of TIC byte 1 of the TIC in ATLSD Table 60, via cable 94, that is currently being addressed by the address stored in ATLSD byte 3 bits 3-0 register file 46. When the current sample count from sample counter 82 is equal to the current maximum sample count of TIC byte 1 of the TIC in ATLSD Table 60 that is currently being addressed by the address stored in ATLSD byte 3 bits 3-0 of register file 46 it generates a Match signal that — see FIG. 23 — via line 98, AND E1506 (with ATLSD byte 3 bit 7 on line 260 being an L signal) and line 262a, increments the address stored in ATLSD byte 3 bits 3-0, via cable 303 from register file 46, using address incrementer 100 (comprised of 4-bit-full-adder E1507). The incremented ATLSD byte 3 bits 3-0 are, via cable 304, coupled to Byte 3 MUX 122 to be coupled to and transferred into ATLSD byte 3 bits 3-0 of register file 46 upon the receipt of an L WE byte 1 ABR signal on line 290. At this time then, at time $t_2$, when the Rate Search signal on line 245a is H and the first signal transition has been detected, sample counter 82 is counting (and accumulating) the current sample counts at a frequency of 1800 Hz while sample count comparator 86 is continuously comparing the current sample count from sample counter 82 to the current maximum sample count that is currently being addressed in ATLSD Table 60 by the address that is stored in ATLSD byte 3 bits 3-0 of register file 46.

After the enabling of sample counter 82 at time $t_2$, CMM 12 continues its port scanning sequence — see FIG. 3 — with no change in the signal conditions of the ATLSD until the CTN detector 102 (comprised of AND E1539, AND E1545 and AND E1546) is testing the contents of ATLSD byte 2 bits 7, 6, 5 of register file 46 (ATLSD byte 3 bit 7 from register file 46 via line 325a is utilized to inhibit the CTN detector 102 after a CTN = 0 signal has been determined) for CTN = 0 and the KTN detector 104 (comprised of AND E1541, AND E1547 and AND E1548) is testing the contents of ATLSD byte 2 bits 3, 2, 1, 0 of register file 46 for KTN = 0. As the exemplary values of CTN and KTN for the presently discussed exemplary example of the operation of the ATLSD as illustrated in FIG. 18 are CTN = 3 and KTN = 5 the CTN detector 102 and the KTN detector 104 will continue to couple H signals to their respective output lines 320 and 321 until their determination of CTN = 0 and KTN = 0.

After the termination of the major cycle and the start of the next major cycle, as at time $t_4$, the L ATLSD byte 2 bit 4 signal on line 241 and the H input data signal on line 62, transition detector 76 couples a transition detect L signal to its output line 246 establishing the pulse length of the positive transition detect H signal.

After the detection of the second signal transition at time $t_4$, CMM 12 continues its port scanning sequence — see FIG. 3 — with no change in the signal conditions of the ATLSD until the major cycle at the time of the third signal transition at time $t_6$. At the time of the third signal transition, the input data waveform, on line 62, is an L signal while concurrently ATLSD byte 2 bit 4, on line 241 from register file 46 is also an L signal. This causes transition detector 76 to couple a transition detect H signal to its output line 246. At this time, as at time $t_1$, the transition detect H signal, via line 246a — see FIG. 23 — couples an H W Transition IN signal to CTN decrementer 108 and KTN decrementer 110 whereby the CTN and the KTN are decremented by a transition count of 1 coupling the respective decremented CTN and KTN to Byte 2 MUX 120. As before, the OR E1531 generated L WE byte 1 ABR signal via line 290 to Byte 2 MUX 120 and Byte 3 MUX 122 couples ATLSD bytes 2 and 3 from register file 46 to Byte 2 MUX 120 and Byte 3 MUX 122 while AND E1532 couples its L WE byte 2 ABR signal to Control byte 2 of register file 46 enabling the transfer of ATLSD byte 2, with the decremented CTN and KTN, into register file 46. Thus, at this time the decremented CTN and KTN (with, e.g., CTN = 0 and KTN = 2) have been stored in register file 46.

At the time of the next following major cycle, as at time $t_6$, the ATLSD byte 2 bit 4 H signal on line 241 and the input data L signal on line 62 cause transition detector 76 to couple a transition detect L signal to its output line 246 establishing the pulse length of the positive transition detect signal. Now with CTN = 0, i.e., 0, 0, 0, stored in ATLSD byte 2 bits 7, 6, 5 and a 0 stored in ATLSD byte 3 bit 7 of register file 46, CTN detector 102 is inhibited from coupling a CTN detect L signal to its output line 320 by the transition detect L signal on line 246 at AND E1539. Thus, CTN detector 102 is inhibited, until the detection of the next signal transition, as at time $t_7$, from generating the necessary CTN detect L signal that will set Status byte 2 bit 3 and ATLSD byte 3 bit 7 in register file 46 to 1's.

After the detection of the third signal transition at time $t_6$, CMM 12 continues its port scanning sequence — see FIG. 3 — with no change in the signal conditions of the ATLSD until the major cycle at the time of the fourth signal transition at time $t_7$. At the time of the fourth signal transition the input data waveform, on line 62, is an H signal while concurrently ATLSD byte 2 bit 4, on line 241 from register file 46 is also an H signal. This causes transition detector 76 to couple a transition detect H signal to its output line 246.

Figure 24:
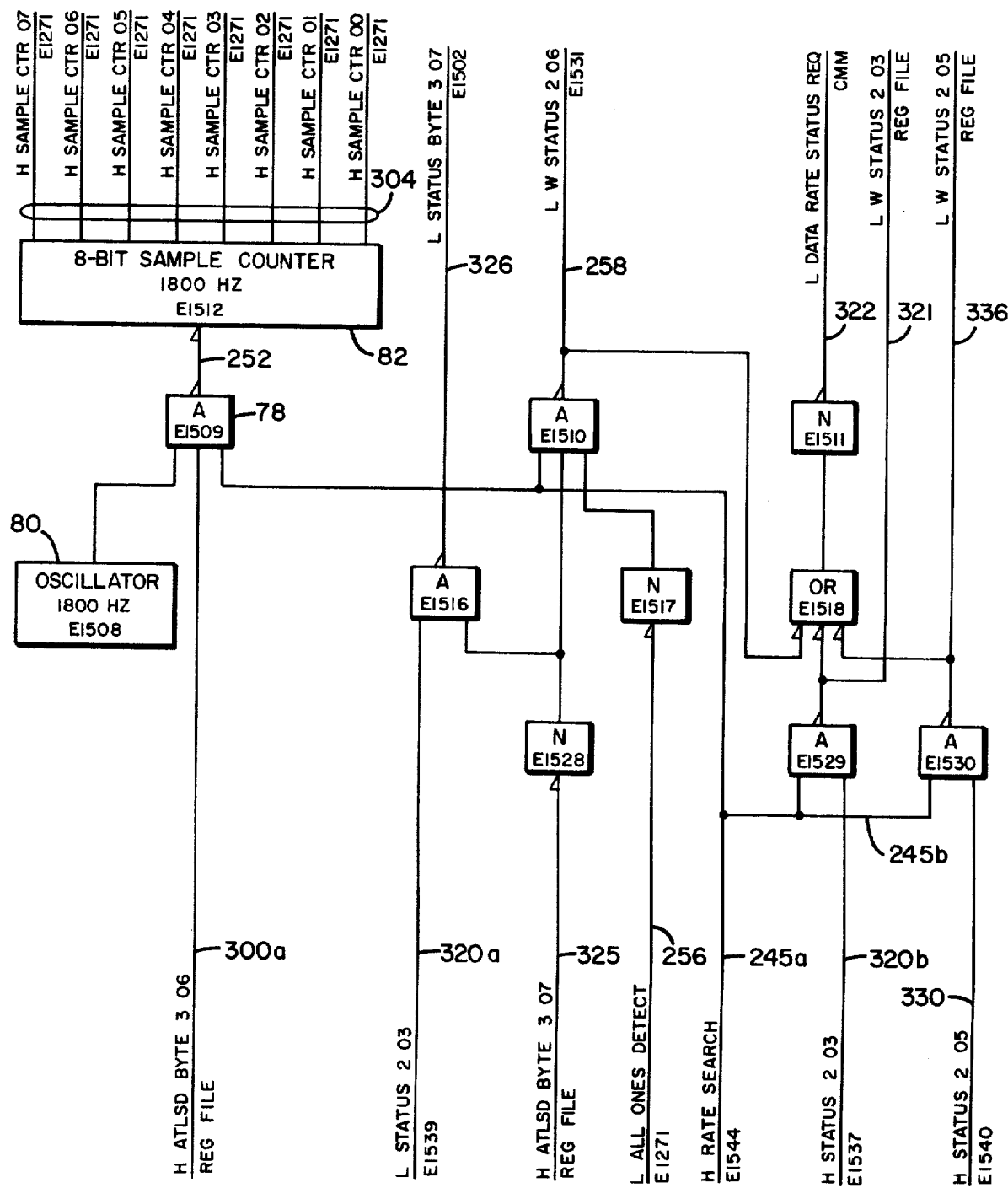
FIG. 24 is a detailed logic diagram of the 1800 Hz clock, the sample counter gate G, the sample counter and the associated logic of FIG. 16.
Figure 25:
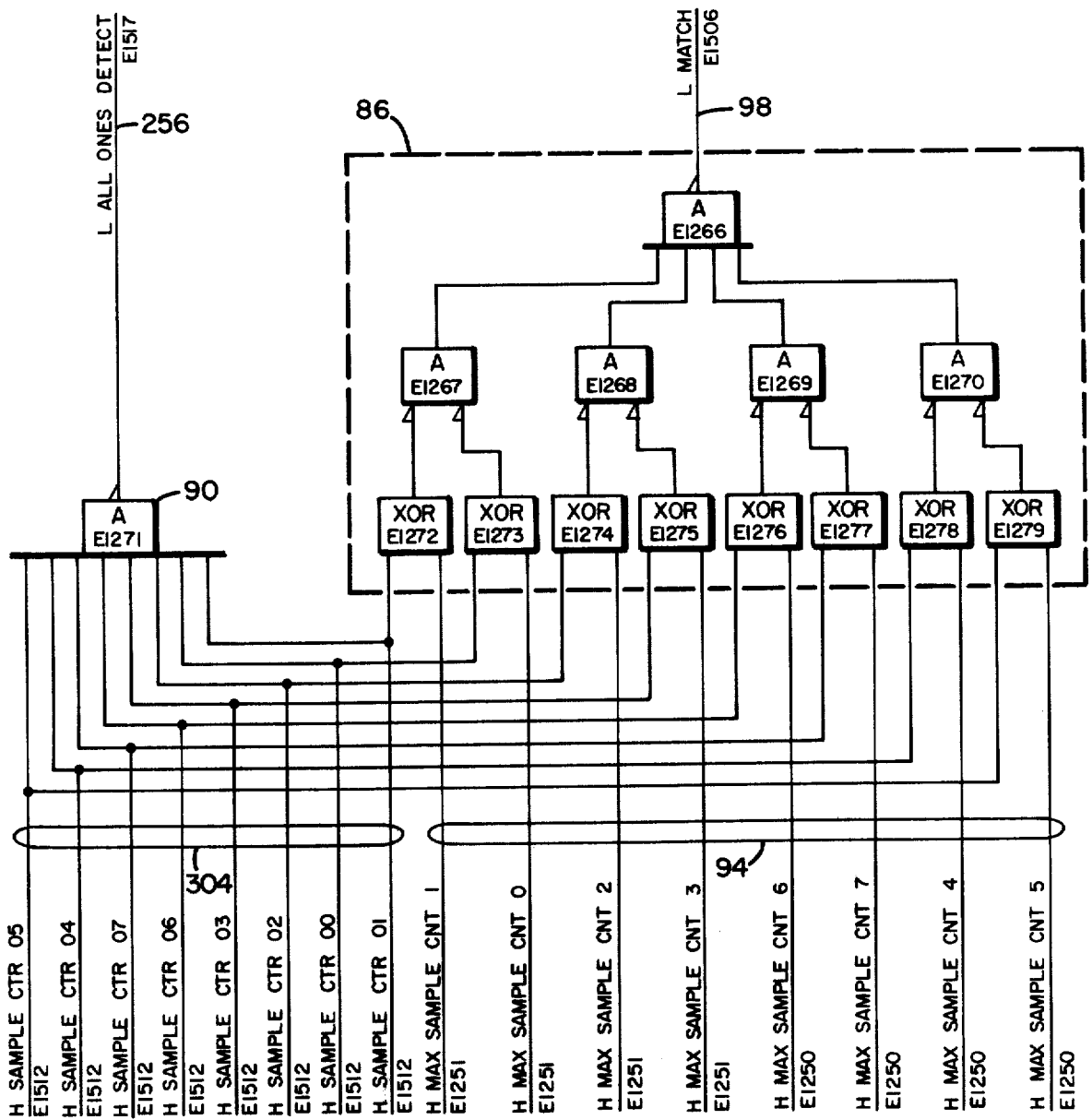
FIG. 25 is a detailed logic diagram of the all 1's detector and the sample counter comparator of FIG. 16.

Now with CTN = 0 having been stored in ATLSD byte 2 bits 7, 6, 5 of register file 46 at time $t_6$, CTN detector 102 AND E1539 is enabled by the transition detect H signal on line 246 and it then couples a CTN detect L signal to its output line 320 and via line 320a an L Status byte 2 bit 3 signal to AND E1516 and via N E1537 and line 320b an H Status byte 2 bit 3 signal to AND E1529 — see FIG. 24. AND E1529 then via line 321 couples an L W Status byte 2 bit 3 signal to register file 46 setting Status byte 2 bit 1 to a 1 generating a Line Terminal Identified signal — see FIG. 20. Note that an L W Status byte 2 bit 3, 5 or 6 signal at OR E1518 will via N E1511 and line 322 couple an L Data Rate Status Request signal to CMM 12. With ATLSD byte 3 bit 7 in register file 46 set to a 0 or L state — see FIG. 7 — the ATLSD byte 3 bit 7 L signal via line 325, from register file 46, and N E1528 enables AND E1516 to couple an L Status byte 3 bit 7 signal to Byte 3 MUX 122 via its output line 326. Now with an L WE byte 1 ABR on line 290 and an L WE byte 3 ABR on line 298, ATLSD byte 3 bit 7 in Control byte 3 of register file 46 will be set to a 1.

Figure 23:
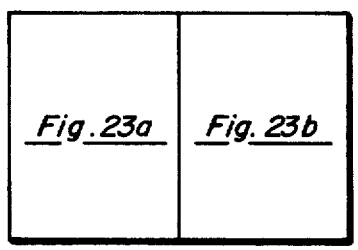
FIG. 23, comprised of FIGS. 23a and 23b, is a detailed logic diagram of the CTN decrementer, the KTN decrementer, the Byte 2 MUX, the Address incrementer and the Byte 3 MUX of FIG. 16.

At this time, as at $t_1$, the transition detect H signal, via line 246a — see FIG. 23 — couples an H W Transition IN signal to KTN decrementer 110 whereby KTN is decremented by a transition count of 1 coupling the decremented KTN to Byte 2 MUX 120. As before, the OR E1531 generated L WE byte 1 ABR signal via line 290 to Byte 2 MUX 120 and Byte 3 MUX 122 couples ATLSD bytes 2 and 3 from register file 46 to Byte 2 MUX 120 and Byte 3 MUX 122 while AND E1532 couples its L WE byte 2 ABR signal to Control byte 2 of register file 46 enabling the transfer of ATLSD byte 2, with the decremented KTN, into register file 46. Thus, at this time the decremented CTN and KTN (with, e.g., CTN = 0 and KTN = 1) have now been stored in register file 46.

At the start of the next major cycle, as at time $t_8$, the H ATLSD byte 3 bit 7 on line 260, from register file 46, causes AND E1506 to couple an L signal to its output lines 262a and 262b inhibiting the incrementing, by address incrementer 100, of the address bits of ATLSD byte 3 bits 3-0 in register file 46 causing the currently addressed TIC in ATLSD Table 60 to remain fixed during the remainder of the ATLSD operation. The L ATLSD byte 3 Carry In signal on line 262b then inhibits the ATLSD Mode H signal on line 245 from enabling AND/OR E1535. The ATLSD byte 2 bit 4 L signal on line 241 and the input data H signal on line 62 cause transition detector 76 to couple a transition detect L signal to its output line 246 establishing the pulse length of the positive transition detect H signal.

After the detection of the fourth signal transition at time $t_8$, CMM 12 continues its port scanning sequence — see FIG. 3 — with no change in the signal conditions of the ATLSD until the major cycle at the time of the fifth signal transition at time $t_9$. At this time the input data signal on line 62 is an L signal while the ATLSD byte 2 bit 4 signal on line 241 is also an L signal. This causes transition detector 76 to couple a transition detect H signal to its output line 246. At this time upon the detection of the fifth signal transition, the ATLSD, as it has upon each signal transition, decrements the KTN held in ATLSD byte 2 bits 3-0 of register file 46. This is accomplished in a manner similar to that discussed at time $t_1$ by the transition detect H signal on line 246 — see FIG. 22 — which via line 246a — see FIG. 23 — couples an H W Transition IN signal to KTN decrementer 110. With ATLSD byte 2 bits 3, 2, 1, 0 from register file 46 coupled via cable 314 to the associated KTN decrementer 110, the KTN is decremented by a transition count of 1 coupling the decremented KTN (with CTN = 0 and KTN = 0) to 2-input-multiplexer E1501 of Byte 2 MUX 120 via cable 315.

Concurrently OR E1531 — see FIG. 22 — couples its L WE byte 1 ABR signal to Byte 2 MUX 120 and Byte 3 MUX 122 via line 290 for coupling ATLSD bytes 2 and 3 from register file 46 to Byte 2 MUX 120 and Byte 3 MUX 122 while AND E1532 via line 296 couples its L WE byte 2 ABR signal to Control byte 2 of register file 46 enabling the transfer of ATLSD byte 2, with the decremented KTN, into register file 46. Thus, at this time the decremented KTN = 0 has been stored in register file 46. Note that during this time the KTN detector 104 is testing the contents of ATLSD byte 2 bits 3, 2, 1, 0 of register file 46 for KTN = 0.

At the start of the next major cycle, as at time $t_{10}$, the H ATLSD byte 2 bit 4 signal on line 241 and the L input data signal on line 62, cause transition detector 76 to couple a transition detect L signal to its output line 246 establishing the pulse length of the positive transition detect H signal. Now with KTN = 0, i.e., 0, 0, 0, 0, stored in ATLSD byte 2 bits 3, 2, 1, 0 of register file 46, KTN detector 104 is inhibited from coupling a KTN detect L signal to its output line 321 by the transition detect L signal on line 246 at AND E1541. This, KTN detector 104 is inhibited, until the detection of the next signal transition, as at time $t_{11}$, from generating the necessary KTN detect L signal that will set Status byte 2 bit 5 in register file 46 to a 1 and generate the Successful ATLSD operation signal — see FIG. 20.

After the detection of the fifth signal transition at time $t_{10}$, CMM 12 continues its port scanning sequence — see FIG. 3 — with no change in the signal conditions of the ATLSD until the time of the sixth signal transition at time $t_{11}$. At the time of the sixth signal transition, the input data waveform on line 62 is an H signal while concurrently ATLSD byte 2 bit 4 is also an H signal. This causes transition detector 76 to couple a transition detect H signal to its output line 246.

Now with KTN = 0 having been stored in ATLSD byte 2 bits 3, 2, 1, 0 of register file 46 at time $t_{10}$, KTN detector 104 AND E1541 is enabled by the transition detect H signal on line 246 and it then couples a KTN detect L signal to its output line 321 and via N E1540 and line 330 an H Status byte 2 bit 5 signal to AND E1530 — see FIG. 24. AND E1530 (along with the H Rate Search signal on line 245b) then via line 336 couples an L W Status byte 2 bit 5 signal to register file 46 setting Status byte 2 bit 5 to a 1 generating a Successful ATLSD operation signal.

At the time of the next following major cycle, as at time $t_{12}$, OR E1531 couples an H WE byte 1 ABR signal to its output line 290 and couples TIC byte 2 and TIC byte 3, from ATLSD Table 60 and the TIC currently addressed when CTN detector 102 determined that CTN = 0, to Byte 2 MUX 120 and Byte 3 MUX 122. Now with AND E1532 coupling an L WE byte 2 ABR signal to its output line 296 and with AND/OR E1535 coupling an L WE byte 3 ABR signal to its output line 298, the TIC byte 2 and TIC byte 3 from the currently addressed TIC in ATLSD Table 60 is transferred into Control byte 2 and Control byte 3 of register file 46. Thus, at this time a successful ATLSD operation has been completed with the terminal identifying characteristics and line speed of the LT on port 0 having been determined and transferred into register file 46 for utilization by CMM 12 to condition its electronics accordingly.

What is claimed is:

1. A detector for the automatic determination of the terminal characteristics and line speeds (ATLSD) of a line terminal comprising:
    receiving means for receiving bit-serially from a communication line a multibit character that is to be transmitted by an associated one of a plurality of line terminals that are of to-be-determined terminal characteristics and line speeds, each of said characters being a multibit word having a first Start bit and a last Stop bit, said Start bit and said Stop bit being separated by a plurality of intermediate Data bits, the signal transition that is formed by a predetermined one of said intermediate Data bits being designated by a count transition number (CTN) and the last signal transition of said character being designated by a character transition number (KTN);
    ATLSD Table means for storing a plurality of terminal identifier characters (TICs), each TIC comprising at least two groups, group 1 and group 2, of which group 1 includes the maximum sample count, i.e., the maximum number of real-time sample counts that is required to count from the Start bit signal transition to the CTN of a particular character, and of which group 2 includes the terminal characteristics and line speed of the line terminal that is associated with the maximum sample count of group 1, each of said TICs being stored in an associated set in an ascending order of maximum sample counts in an associated one of a plurality of ascendingly ordered addressable locations in said ATLSD Table means;
    transition detector means coupled to said receiving means for detecting said character signal transitions;
    real-time sample counter means coupled to said transition detector means for counting and accumulating the current sample count of real-time sample counts beginning with the signal transition generated by the Start bit of said character;
    sample count comparator means coupled to said real-time sample counter means and to said ATLSD Table means for comparing the current sample count that has been accumulated by said real-time sample counter means to the current maximum sample count that is stored in the ATLSD Table means addressable location that is currently being addressed and for incrementing the address of said addressable location when said current sample count equals said current maximum sample count.

2. The ATLSD of claim 1 further including:
    ATLSD register means for storing the CTN and the KTN that are associated with all of the line terminals of a set of line terminals that is associated with the selected one of said communication lines and for storing the starting address location in said ATLSD Table means in which is stored the TIC having the minimum sample count of the range of maximum sample counts that is associated with all of the line terminals of said set of line terminals that is associated with said selected one of said communication lines;
    CTN detector means responsively coupled to said ATLSD register means and said transition detector means for generating a CTN detect signal when the number of signal transitions detected by said transition detector means equals the CTN; and
    said CTN detect signal coupled to said ATLSD Table means for disabling the incrementing of the address of the addressable location that is currently being addressed.

3. The ATLSD of claim 1 further including KTN detector means responsively coupled to said ATLSD register means and said transition detector means for generating a KTN detect signal when the number of signal transitions detected by said transition detector means equals the KTN;
    said KTN detect signal coupled to said transition detector means for disabling the detection of said signal transitions; and said KTN detect signal coupled to said ATLSD Table means for reading out group 2 of the TIC stored in the addressable location of said ATLSD Table means that is currently being addressed by the address stored in said ATLSD register means.

4. The ATLSD of claim 1 further including KTN detector means responsively coupled to said ATLSD register means and said transition detector means for generating a KTN detect signal when the number of signal transitions detected by said transition detector means equals the KTN; and said KTN detect signal coupled to said ATLSD Table means for reading out group 2 of the TIC stored in the addressable location of said ATLSD Table means that is currently being addressed by the location address stored in said ATLSD register means.

5. The ATLSD of claim 1 further including clocking signal generator means for generating a real-time clocking signal having a frequency F; and, said real-time clocking signal coupled to said real-time sample counter means for counting said current sample count at said frequency F.

6. A detector for the automatic determination of the terminal characteristics and line speeds (ATLSD) of a plurality of line terminals that are to be demultiplexed from a plurality of communication lines, comprising:

demultiplexing means for receiving bit-serially from a selected one of a plurality of communication lines a plurality of first characters, each of which first characters is the first character that is to be transmitted by an associated one of a plurality of line terminals that are of to-be-determined terminal characteristics and line speeds, each of said first characters being a multibit word having a first Start bit signal transition and a last Stop bit signal transition, said Start bit and said Stop bit being separated by a plurality of intermediate Data bit signal transitions, the signal transition that is formed by a predetermined one of said intermediate Data bits being designated by a count transition number (CTN) and the last signal transition of said first character being designated by a character transition number (KTN);

ATLSD Table means for storing a plurality of terminal identifier characters (TICs), each TIC comprising three bytes byte 1, byte 2 and byte 3, of which byte 1 includes the maximum sample count, i.e., the maximum number of sample counts that is required to count from the Start bit signal transition to the CTN of a particular Start character, and of which bytes 2 and 3 include the terminal characteristics and line speed of the line terminal that is associated with the maximum sample count of byte 1, each of said TICs being stored in an ascending order of maximum sample counts in an associated one of a plurality of ascendingly ordered addressable locations in said ATLSD Table means;

ATLSD register means coupled to said ATLSD Table means for storing the CTN and the KTN that are associated with all of the line terminals of a set of line terminals that is associated with the selected one of said communication lines and for storing the starting location address in said ATLSD Table means in which is stored the TIC having the minimum maximum sample count of the range of maximum sample counts that is associated with all of the line terminals of said set of line terminals that is associated with said selected one of said communication lines;

transition detector means coupled to said demultiplexing means for detecting the first character signal transitions and then generating a transition signal upon the detection of each first character signal transition including said Start bit signal transition;

clocking signal generator means for generating a real-time clocking signal that is comprised of a plurality of relatively short duration clocking pulses having a frequency F;

sample counter means coupled to said clocking signal generator means and to said transition detector means for counting and accumulating the current sample count beginning with the signal transition generated by said Start bit;

sample count comparator means coupled to said sample counter means and to said ATLSD Table means for comparing the current sample count that has been accumulated by said sample counter means to the current maximum sample count that is stored in the ATLSD Table addressable location that is currently being addressed and for incrementing the address of said addressable location when said current sample count equals said current maximum sample count.

7. The ATLSD of claim 6 further including CTN detector means responsively coupled to said ATLSD register means and said transition detector means for generating a CTN detect signal when the number of signal transitions detected by said transition detector means equals the CTN; and said CTN detect signal coupled to said ATLSD Table means for disabling the incrementing of the address of the addressable location that is currently being addressed.

8. The ATLSD of claim 7 further including KTN detector means responsively coupled to said ATLSD register means and said transition detector means for generating a KTN detect signal when the number of signal transitions detected by said transition detector means equals the KTN;

said KTN detect signal coupled to said transition detector means for disabling the detection of said signal transitions; and, said KTN detect signal coupled to said ATLSD Table means for reading out bytes 2 and 3 of the TIC that is stored in the addressable location of said ATLSD Table means that was currently being addressed when said CTN detect signal was coupled to said ATLSD Table means.

9. The ATLSD of claim 7 further including KTN detector means responsively coupled to said ATLSD register means and said transition detector means for generating a KTN detect signal when the number of signal transitions detected by said transition detector means equals the KTN;

said KTN detect signal coupled to said ATLSD Table means for reading out bytes 2 and 3 of the TIC that is stored in the addressable location of said ATLSD Table means that is currently being addressed; and, said KTN detect signal coupled to said sample counter means for terminating the counting and accumulating of said sample counts.

10. A detector for the automatic determination of the terminal characteristics and line speeds (ATLSD) of a plurality of line terminals that are to be demultiplexed from a plurality of communication lines, comprising:

demultiplexing means for receiving bit-serially from a selected one of a plurality of communication lines characters, each of which characters is the first character that is to be transmitted by an associated one of a plurality of line terminals that are to-be-determined terminal characteristics and line speeds, each of said characters being a multibit word having a first Start bit and a plurality of Data bits, a predetermined non-recurring one of said Data bits being designated by a count transition number (CTN) as a CTN bit;

ATLSD Table means for storing a plurality of terminal identified characters (TICs), each TIC being comprised of at least two groups, group 1 and group 2, of which group 1 includes the maximum sample count, i.e., the maximum number of sample counts that is required to count from said Start bit to the CTN bit of a particular character, and of which group 2 includes the terminal characteristics and line speed of the line terminal that is associated with the maximum sample count of group 1, each of said TICs being stored in an associated one of a plurality of addressable locations in said ATLSD means;

ATLSD register means for storing the CTN that is associated with all of the line terminals of a set of line terminals that is associated with a selected one of said communication lines and coupled to said ATLSD Table means for storing the starting location address in said ATLSD Table means in which is stored the TIC having the minimum maximum sample count of the range of maximum sample counts that is associated with all of the line terminals of said set of line terminals that is associated with said selected one of said communication lines;

character detector means coupled to said demultiplexing means to detect said Start bit and the non-recurring ones of said Data bits for generating a character pulse upon the detection of said Start bit and each of the non-recurring ones of said Data bits;

sample time signal generator means for generating a fixed frequency sample signal that is comprised of a plurality of sample counts of a frequency F;

current sample counter means responsively coupled to said sample time signal generator means and said character detector means for counting the number of sample counts beginning with the first character pulse that is associated with said Start bit and accumulating the current sample count;

sample count comparator means responsively coupled to said current sample counter means and said ATLSD Table means for comparing the current count of the sample counts that have been counted by said current sample counter means to the current maximum sample count that is stored in the ATLSD Table addressable location that is currently being addressed by the location address stored in said ATLSD register means and for altering said location address that is stored in said ATLSD register means in response to said comparison.

11. The ATLSD of claim 10 further including:

CTN decrementer means couled to said character detector means and to said ATLSD register means for decrementing the CTN stored in said ATLSD register means upon the detection of each of the non-recurring ones of said Data bits.

12. The ATLSD of claim 11 further including:

CTN detector means coupled to said character detector means and to said ATLSD register means for comparing the CTN stored in said ATLSD register means to 0 and generating a CTN = 0 detect signal when the CTN stored in said ATLSD register means is 0; and, said CTN = 0 detect signal coupled to said ATLSD Table means for disabling the alteration of the address of the addressble location of said ATLSD Table means that is currently being addressed when said CTN = 0 detect signal is generated.

13. A detector for the automatic determination of the terminal characteristics and line speeds (ATLSD) of a plurality of line terminals that are to be demultiplexed from a plurality of communication lines, comprising:

demultiplexing means for receiving bit-serially from a selected one of a plurality of communication lines first characters, each of which first characters is the first character that is to be transmitted by an associated one of a plurality of line terminals that are of to-be-determined terminal characteristics and line speeds, each of said first characters being a multibit word having a first Start bit represented by a Mark to Space transition and a last Stop bit, said Start bit and said Stop bit being separated by a plurality of intermediate Data bits, the signal transition that is formed by a predetermined one of said intermediate Data bits being designated by a count transition number (CTN) and the last signal transition of said first character being designated by a character transition number (KTN);

ATLSD Table means for storing a plurality of terminal identifier characters (TICs), each TIC comprising at least two groups, group 1 and group 2, of which group 1 includes the maximum sample count, i.e., the maximum number of sample counts that is required to count from the Start bit transition to the CTN of a particular start character, and of which group 2 includes the terminal charcteristics and line speed of the line terminal that is associated with the maximum sample count of group 1, eachof said TICs being stored in an ascending order of maximum sample counts in an associated one of a plurality of ascendingly ordered addressable locations in said ATLSD Table means;

transition detector means coupled to said demultiplexing means for detecting the first character signal transitions, from Mark to Space and from Space to Mark, and generating a transition detect signal upon the detection of each first character signal transition including said Start bit transition;

real-time sample counter means coupled to said transition detector means for starting the generation and counting of a current sample count upon the detection of said Start bit transition;

sample count comparator means coupled to said real-time sample counter means and said ATLSD Table means for comparing the current sample count from said sample counter means to the current maximum sample count of the TIC that is currently being addressed by the location address stored in said ATLSD register means for generating a Match signal whenever said current sample count equals said current maximum sample count;

address incrementer means coupled to said ATLSD Table means and said sample count comparator means for incrementing the current location address and addressing the next ascendingly ordered addressable location in said ATLSD Table means whenever said sample count comparator generates said Match signal.

14. The ATLSD of claim 13 further including:
a clocking signal source of a clocking signal of a frequency F;
clocking signal gating means for gating said clocking signal to said sample counter means for generating and counting said sample counts at said frequency F;
ATLSD register means for storing an ATLSD mode code and the CTN and the KTN that are associated with all of the line terminals of the set of line terminals that is associated with the selected one of said communication lines;
ATLSD mode decoder means responsively coupled to said ATLSD mode code in said ATLSD register means and in response to said ATLSD mode code coupling a Rate Search signal to said transition detector means for enabling said transition detector means to generate said transition detect signal and coupling said Rate Search signal to said clocking signal gating means for enabling said clocking signal gating means to couple said clocking signal to said sample counter means.

15. The ATLSD of claim 14 further including:
CTN decrementer means coupled to said ATLSD register means and said transition detector means for decrementing said CTN stored in said ATLSD register means upon the detection of each Mark to Space and Space to Mark transition beginning with the Mark to Space transition of said Start bit;
KTN decrementer means coupled to said ATLSD register means and said transition detector means for decrementing said KTN stored in said ATLSD register means upon the detection of each Mark to Space and Space to Mark transition beginning with the Mark to Space transition of said Start bit;
CTN detector means coupled to said ATLSD register means for generating a CTN detect signal when said CTN stored in said ATLSD register means has been decremented to 0 by said CTN decrementer means;
KTN detector means coupled to said ATLSD register means for generating a KTN detect signal when said KTN stored in said ATLSD register means has been decremented to 0 by said KTN decrementer means.

16. The ATLSD of claim 15 further including:
multiplexer means responsively coupled to said KTN detector means for transferring the TIC group 2 of the currently addressed addressable location of said ATLSD Table means to said ATLSD register means when said KTN detector means has generated said KTN detect signal;
said multiplexer means further responsively coupled to said CTN decrementer means and said KTN decrementer means for coupling said decremented CTN and KTN to said ATLSD register means.

17. The ATLSD of claim 16 further including:
all 1's detector means coupled to said sample counter means for generating a status signal when it determines that said sample counter means has counted to its maximum number of sample counts before said KTN detector means has generated said KTN detect signal.

18. A detector for the automatic determination of the terminal characteristics and line speeds (ATLSD) of a plurality of line terminals that are to be demultiplexed from a plurality of communication lines, comprising:
demultiplexing means for bit-serially receiving from a selected one of a plurality of communication lines a plurality of first characters, each of which first characters is the first character that is to be transmitted by an associated one of a plurality of line terminals that are of to-be-determined terminal characteristics and line speeds, each of said first characters being a multibit word having a first Start bit represented by a Mark to Space transition and a last Stop bit, said Start bit and said Stop bit separated by a plurality of intermediate Data bits, the signal transition that is formed by a predetermined one of said intermediate Data bits being designated by a count transition number (CTN) and the last signal transition of said first character being designated by a character transition number (KTN);
ATLSD Table means for storing a plurality of terminal identifier characters (TICs), each TIC comprising at least two groups, group 1 and group 2, of which group 1 includes the maximum sample count, i.e., the maximum number of sample counts that is required to count from the Start bit transition to the CTN of a particular first character, and of which group 2 includes the terminal characteristics and line speed of the line terminal that is associated with the maximum sample count of group 1, each of said TICs being stored in an ascending order of maximum sample counts in an associated one of a plurality of ascendingly ordered addressable locations in said ATLSD Table means;
ATLSD register means for storing the ATLSD mode code and the CTN and the KTN that are associated with all of the line terminals of the set of line terminals that is associated with the selected one of said communication lines and for storing the starting address of the addressable location in said ATLSD Table means in which is stored the TIC having the minimum maximum sample count of the range of maximum sample counts that is associated with all of the line terminals of the set of line terminals that is associated with said selected one of said communication lines;
transition detector means coupled to said demultiplexing means for detecting the first character signal transitions, from Mark to Space and from Space to Mark, and generating a transition detect signal upon the detection of each first character signal transition including said Start bit transition;
sample counter means for generating and counting current sample counts;
a clocking signal source of a clocking signal of a frequency F;
clocking signal gating means for gating said clocking signal to said sample counter means for generating and counting said sample counts at said frequency F;
ATLSD mode decoder means coupled to said ATLSD register means for coupling a Rate Search signal to said transition detector means for enabling said transition detector means to generate said transition detect signal and for coupling said Rate Search signal to said clocking signal gating means for enabling said clocking signal gating means to couple said clocking signal to said sample counter means;

sample count comparator means responsively coupled to said transition detector means and coupled to said sample counter means and said ATLSD Table means for enabling the comparison of the current sample count from said sample counter means to the current maximum sample count of the TIC that is currently being addressed by the address stored in said ATLSD register means for generating a Match signal whenever said current sample count equals said current maximum sample count;

address incrementer means coupled to said ATLSD register means, said ATLSD Table means and said sample count comparator means for incrementing the address of the current addressable location that is being addressed in said ATLSD Table means and addressing the next ascendingly ordered addressable location in said ATLSD Table means whenever said sample count comparator generates said Match signal;

CTN decrementer means coupled to said ATLSD register means and said transition detector means for decrementing said CTN stored in said ATLSD register means upon the detection of each Mark to Space and Space to Mark transition beginning with the Mark to Space transition of said Start bit;

KTN decrementer means coupled to said ATLSD register means and said transition detector means for decrementing said KTN stored in said ATLSD register means upon the detection of each Mark to Space and Space to Mark transition beginning with the Mark to Space transition of said Start bit;

CTN detector means coupled to said ATLSD register means for generating a CTN detect signal when said CTN stored in said ATLSD register means has been decremented to 0 by said CTN decrementer means;

KTN detector means coupled to said ATLSD register means for generating a KTN detect signal when said KTN stored in said ATLSD register means has been decremented to 0 by said KTN decrementer means;

multiplexer means responsively coupled to said KTN detector means for transferring the TIC group 2 of the currently addressed addressable location of said ATLSD Table means to said ATLSD register means when said KTN detector means has generated said KTN detect signal;

said multiplexer means further responsively coupled to said CTN decrementer means, said KTN decrementer means and said address incrementer means for coupling said decremented CTN and KTN and said incremented ATLSD Table address to said ATLSD register means.

19. In a data processing system in which a central processor at a central site may be selectively coupled to one of a plurality of line terminals of unknown, differing terminal characteristics and line speeds at a plurality of remote sites including detector means at the central site for analyzing the signal transmitted by the unknown line terminal for its terminal characteristics and line speed, said detector means characterized by an automatic terminal and line speed detector comprising:

look-up table means in which are stored a plurality of terminal identifier characters each of which includes a maximum sample count and associated terminal characteristics and line speed;

transition detector means for counting the signal transitions of the transmitted signal;

real-time sample counter means coupled to said transition detector means for starting the generation and accumulation of a current sample count upon the detection of a first one of said signal transitions;

comparator means responsively coupled to said real-time sample counter means and said look-up table means for comparing the current sample count to the maximum sample counts stored in said look-up table means; and logic means responsively coupled to said transition detector means and said look-up table means for reading from said look-up table means the terminal characteristics and line speed of the transmitting line terminal that are associated with the maximum sample count found to compare with the current sample count when the number of detected signal transitions is of a predetermined value.

* * * * *

UNITED STATES PATENT AND TRADEMARK OFFICE
CERTIFICATE OF CORRECTION

PATENT NO. : 4,003,032
DATED : January 11, 1977
INVENTOR(S) : Michael M. Austin, et al It is certified that error appears in the above-identified patent and that said Letters Patent are hereby corrected as shown below:

Column 6, Line 67, Table A "26.65" should be --26.66--.

Column 23, Line 46, "minimum sample count" should be --minimum maximum sample count--.

Column 29, Line 47, after "three bytes" insert a comma --,--.

Column 31, Line 66, "couled" should be --coupled--.

Column 32, Line 46, "eachof" should be --each of--.

Signed and Sealed this

Twenty-ninth Day of March 1977

[SEAL]

Attest:

RUTH C. MASON
*Attesting Officer*

C. MARSHALL DANN
*Commissioner of Patents and Trademarks*